(12) United States Patent
Zhang et al.

(10) Patent No.: US 12,496,272 B1
(45) Date of Patent: Dec. 16, 2025

(54) STABLE EPINEPHRINE SUSPENSION FORMULATION FOR INHALATION WITH HFO PROPELLANT

(71) Applicant: Amphastar Pharmaceuticals, Inc., Rancho Cucamonga, CA (US)

(72) Inventors: Jack Yongfeng Zhang, Rancho Cucamonga, CA (US); Mary Zi-ping Luo, Rancho Cucamonga, CA (US); Ying Wang, Rancho Cucamonga, CA (US); Ray Lameng Lei, Rancho Cucamonga, CA (US); Christos Lymberopoulos, Rancho Cucamonga, CA (US); Tielong Gao, Rancho Cucamonga, CA (US)

(73) Assignee: Amphastar Pharmaceuticals, Inc., Rancho Cucamonga, CA (US)

( * ) Notice: Subject to any disclaimer, the term of this patent is extended or adjusted under 35 U.S.C. 154(b) by 0 days.

(21) Appl. No.: 18/790,336

(22) Filed: Jul. 31, 2024

(51) Int. Cl.
| | |
|---|---|
| *A61K 9/00* | (2006.01) |
| *A61K 31/137* | (2006.01) |
| *A61K 47/06* | (2006.01) |
| *A61K 47/10* | (2017.01) |
| *A61K 47/26* | (2006.01) |

(52) U.S. Cl.
CPC ............ *A61K 9/008* (2013.01); *A61K 31/137* (2013.01); *A61K 47/06* (2013.01); *A61K 47/10* (2013.01); *A61K 47/26* (2013.01)

(58) Field of Classification Search
CPC ...... A61K 9/008; A61K 31/137; A61K 47/06; A61K 47/10; A61K 47/26
See application file for complete search history.

(56) References Cited

U.S. PATENT DOCUMENTS

| | | | |
|---|---|---|---|
| 8,367,734 B1 | 2/2013 | Gao et al. | |
| 9,308,199 B2 | 4/2016 | Knopeck et al. | |
| 2022/0331237 A1* | 10/2022 | Luciuk | A61K 9/008 |
| 2023/0026203 A1* | 1/2023 | Joshi | A61K 31/44 |
| 2024/0216275 A1 | 7/2024 | Cocks et al. | |

FOREIGN PATENT DOCUMENTS

| | | | |
|---|---|---|---|
| EP | 4197528 B1 | 4/2024 | |

OTHER PUBLICATIONS

Chris Baron, et al., "Investigating the Propellant Pathways Leading to a Sustainable Future for MDIS," OnDrugDelivery 131, Apr. 2022 [5 Pages].

Hui Wang, et al., "Understanding the performance of pressurized metered dose inhalers formulated with low Global warming potential propellants," Aerosol Science and Technology, vol. 58, No. 2, 2024 [20 Pages].

* cited by examiner

*Primary Examiner* — Robert A Wax
*Assistant Examiner* — Quanglong N Truong
(74) *Attorney, Agent, or Firm* — IceMiller LLP

(57) ABSTRACT

Pharmaceutical aerosol formulations containing pre-micronized epinephrine, co-solvent ethanol, surfactant polysorbate 80, and propellant trans-1,3,3,3-tetrafluoropropene (HFO-1234ze(E)) for use in a pressurized metered dose inhaler is described. The formulations provide a highly efficient delivery of pre-micronized epinephrine particles into the patients' respiratory tracts and have the advantages of high efficacy, improved safety, and a low global warming potential (GWP) for environmental impact.

21 Claims, 8 Drawing Sheets

STABLE EPINEPHRINE SUSPENSION FORMULATION FOR INHALATION WITH HFO PROPELLANT

FIELD OF THE INVENTION

The present invention pertains to aerosol formulations for the delivery of medications suitable for administration via the respiratory tract. More particularly, the present invention pertains to a stable suspension formulation containing epinephrine, or its salt forms, ethanol, surfactant, and hydrofluoroolefin (HFO) propellant for use in a pressurized metered dose inhaler (MDI) in the treatment of bronchial asthma.

BACKGROUND OF THE INVENTION

Medications for the treatment of respiratory disorders are commonly administered by inhalation through the mouth or nose in an aerosol formulation. One such medication is epinephrine. Epinephrine is approved to be used as a bronchodilator in the treatment of acute bronchial asthma and is available with the use of a propellant in a pressurized metered dose inhaler (MDI). The formulations for inhalable epinephrine have gone through levels of change and development over the years in response to environmental concerns connected to the use of different propellants.

The earliest epinephrine pressurized MDI formulation was manufactured as an over-the-counter (OTC) medication under the name Primatene MIST® (CFC), which utilized chlorofluorocarbon (CFC) as the propellant to deliver medication doses into patients' respiratory tracts. While the CFC formulation was proven to be safe and effective for over 50 years, the environmental concerns regarding the ozone depletion effect of CFC propellants led to their phasing out by 2010 to fulfill the requirements of the Montreal Protocol. This resulted in the eventual banning of their use and necessitated the discovery of a viable alternative.

Hydrofluoroalkanes (HFAs) emerged as the best alternative to replace CFC propellants in pressurized MDIs for pharmaceutical use due to having no ozone-depleting effect. HFA propellants, such as HFA-134a (1,1,1,2-tetrafluoroethane) and HFA-227 (1,1,1,2,3,3,3-heptafluoropropane), were introduced for pressurized MDIs in the 1990s and have demonstrated similar properties to CFC propellants. HFA-134a and HFA-227 are now two major propellants in the current pressurized MDI market. Currently, Primatene MIST® HFA has been reformulated with HFA propellant and has improved efficacy and safety compared to the previous CFC formulation.

Although Primatene MIST® HFA does not damage the atmospheric ozone layer, HFA propellants are formidable greenhouse gases that absorb infrared radiation and trap heat in the Earth's atmosphere resulting in a rise in global temperatures via the greenhouse effect. The amount of radiation a greenhouse gas can absorb over a period of time while in the atmosphere is measured through its global warming potential (GWP). HFA propellants have high GWPs that contribute to climate change. As a result, the U.S. Environmental Protection Agency has adopted an allowance allocation program to phase down the current production and consumption levels of pressurized MDI propellants such as HFA-134a and HFA-227.

U.S. Pat. No. 9,308,199 to Knopeck, et al. proposed hydrofluoroolefins (HFOs), specifically 1,3,3,3-tetraflouropropene (HFO-1234ze), as suitable alternative propellants for their lower environmental impact. The GWP of HFO-1234ze is approximately 200 times lower than that of HFA-134a (6 versus 1300) or approximately 500 times lower than that of HFA-227 (6 versus 2900). The propellant HFO-1234ze is considered to be a suitable alternative for pressurized MDI formulations as it demonstrates similar physical properties (density, vapor pressure, moisture solubility, dipole moment) to HFA-134a and HFA-227 (see Table 1-1).

Despite proposing using HFOs, including HFO-1234ze, U.S. Pat. No. 9,308,199 to Knopeck, et al. does not include any testing establishing that HFO-1234ze can be a suitable propellant for aerosol formulations containing an active pharmaceutical ingredient. Since Knopeck et al., HFOs have been explored as potential alternative propellant. For example, Baron and Shur note that "the leading propellant options for the next generation of low-GWP MDIs are HFA 152a and HFO 1234ze from the hydrofluoroolefin family. Much work has already been carried out by industry stakeholders to evaluate these gases. But further work is still required to build a complete picture of their chemical and physical properties as propellants, as well as their suitability and safety within drug delivery systems." Baron and Shur, *ONdrugDelivery*, 131, 49-52 (Apr. 2022). Wang et al. investigated various low global warming potential propellants and observed that "[w]hile formulation challenges may exist for certain active pharmaceutical ingredients and excipients not tested, the co-suspension of BGF with porous particles demonstrated consistent performance in all low-GWP propellants tested." Wang et al., *Aerosol Science and Technology*, 58:2, 115-133 (Jan. 2024). Despite HFOs have been recognized as a viable propellant replacement, there has yet been a specific epinephrine MDI formulation developed utilizing HFO.

Therefore, there is an unmet medical need for a new, alternative epinephrine MDI formulation that provides at least comparable efficacy and safety effects while also addressing the environmental concerns of global warming.

SUMMARY OF THE INVENTION

The instant disclosure provides aerosol suspension formulations of epinephrine in HFO-1234ze(E) with high respirable drug delivery deposition suitable for administration by inhalation utilizing a pressurized MDI. The formulations contain a therapeutically effective amount of pre-micronized epinephrine or its pharmaceutically acceptable salt form for the use of temporary relief of mild symptoms of intermittent asthma.

The formulations are suspensions in a pressurized MDI and essentially contain pre-micronized epinephrine particles suspended in a solution of a surfactant, a co-solvent in hydrofluoroolefin (HFO) propellant. The propellant typically includes trans-1,3,3,3-tetrafluropropene, also known as HFO-1234ze(E). In certain embodiments, the preferred surfactant is polysorbate 80. In other embodiments, the preferred co-solvent is ethanol. Without being bound by theory, the surfactant (e.g., polysorbate 80) and the co-solvent (e.g., ethanol) are present in an amount sufficient to prevent agglomeration or flocculation of the drug particles and to maintain the physical stability of the suspension.

An object of the disclosure is to provide a comparable inhalable epinephrine suspension formulation to Primatene MIST® HFA that is capable of effective respirable drug delivery of epinephrine molecules to a therapeutic site with comparable efficacy and safety.

Another object of the disclosure is to provide a suspension formulation containing epinephrine and an HFO propellant that is suitable for delivery in a pressurized MDI and exhibits a uniform dosing level that is reproducible over the life of the inhaler.

The purpose of the present disclosure is to demonstrate greater mindfulness in working towards the goal of mitigating the effects of global warming by providing an inhalable epinephrine suspension aerosol formulation for delivery to the pulmonary air passages that is free of HFA propellant with a near-zero global warming potential (GWP). More specifically, in the preferred compositions, the propellant of the present invention has a negligible contribution to ozone depletion and has a very low contribution to global warming compared to other commonly used HFAs, such as HFA-134a and HFA-227. HFO-1234ze does not have a substantially negative effect on the atmospheric environment and chemistry.

Without being bound by theory, the formulations of the disclosure are more environmentally sustainable than and comparably stable to Primatene MIST® HFA.

In one embodiment, the formulation contains: a suspension formulation of pre-micronized epinephrine free base or a pharmaceutically acceptable salt thereof; a pressurized, liquefied propellant comprising a hydrofluoroolefin (HFO) (e.g., HFO-1234ze) in an amount of from about 91% to about 99% (w/w) relative to the total weight of the formulation; a co-solvent not more than about 8% (w/w) relative to the total weight of the formulation; and a surfactant in an amount not more than about 0.2% (w/w) relative to the total weight of the formulation.

A variety of co-solvents may be used including ethyl alcohol, isopropyl alcohol, propylene glycol, ethylene glycol, propane, butane, isobutene, pentane, dimethyl ether, diethyl ether, and a combination thereof. In one embodiment, the co-solvent is ethanol, which may be present in an amount of 0.1% to 8.0% (w/w) relative to the total weight of the formulation.

In addition, a variety of different surfactants may be used, such as polysorbate, polyethylene glycol, oleic acid, lecithin, and a combination thereof. In one embodiment the surfactant is polysorbate 80, which may be present in an amount of not more than 0.2% (w/w) relative to the total weight of the formulation.

In certain embodiments, the formulations do not contain an antioxidant (i.e., they are devoid of an antioxidant, they are without an antioxidant or antioxidant-free). In some embodiments, the formulations do not contain (are devoid of) an antioxidant selected from the group consisting of thymol, tocopherol, ascorbyl palmitate, butylated hydroxyanisole, butylated hydroxytoluene, propyl gallate, citric acid, sodium metabisulfite, sodium sulfite, and a combination thereof.

Other features and advantages of the invention will be apparent from the detailed description and examples that follow.

BRIEF DESCRIPTION OF THE DRAWINGS

The foregoing summary, as well as the following detailed description of the invention, will be better understood when read in conjunction with the appended figures. For the purpose of illustrating the invention, the figures demonstrate embodiments of the present invention. It should be understood, however, that the invention is not limited to the precise arrangements, examples, and instrumentalities shown.

DETAILED DESCRIPTION

This disclosure is based on the discovery of epinephrine suspension formulations for MDIs, which avoid environmental concerns associated with Primatene MIST® HFA. These suspension formulations provide comparable efficacy and safety of respirable drug delivery to that of Primatene MIST® HFA while utilizing HFO propellant with a lower GWP than HFA and a near zero global warming effect. The disclosure provides the first specific epinephrine MDI formulations utilizing trans-1,3,3,3-tetraflouropropene (HFO-1234ze(E)) as a medical propellant.

Figure 1:
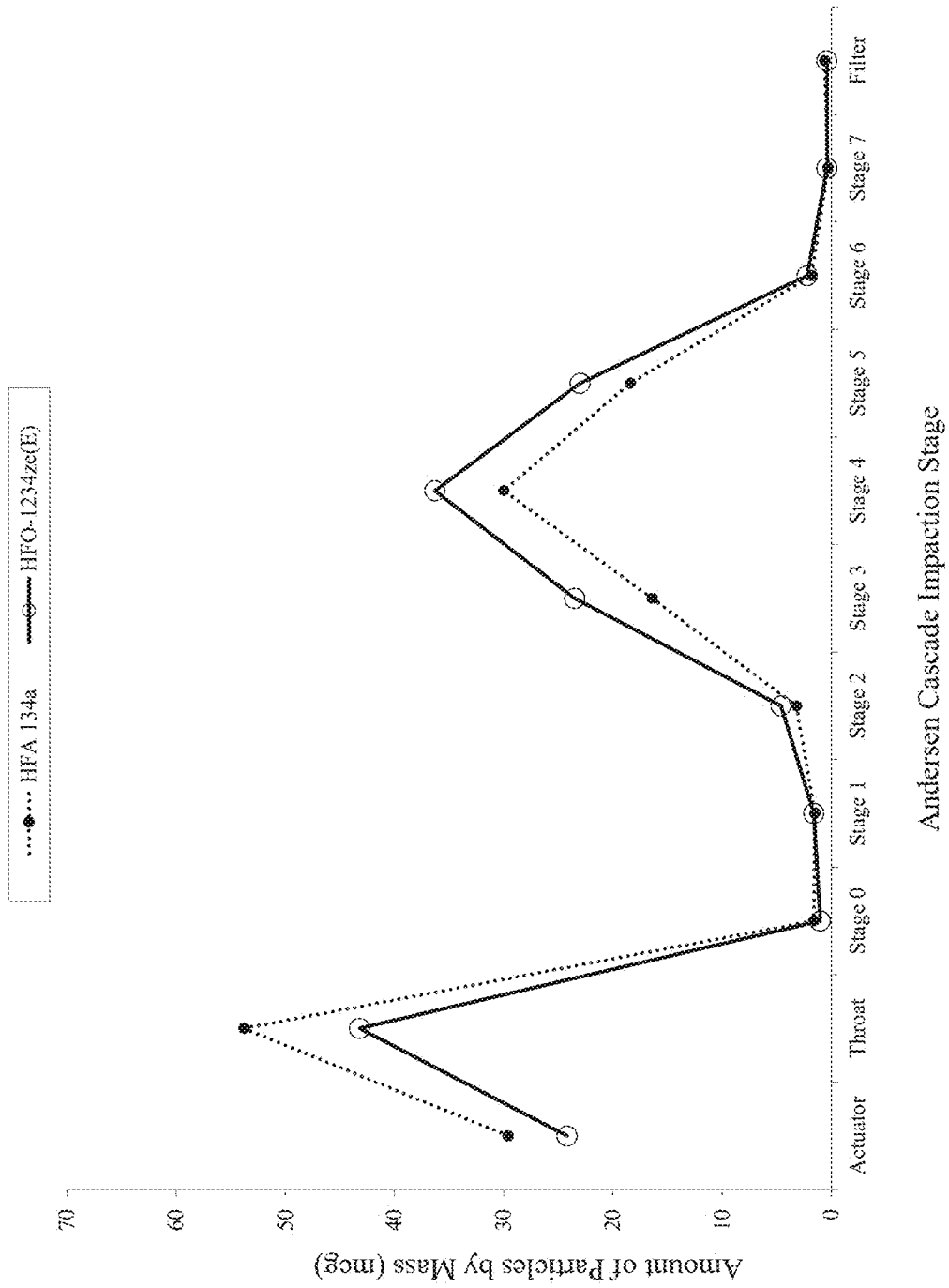
FIG. 1 is a chart showing Andersen Stage Distribution of Epinephrine Suspension using HFO-1234ze(E) and HFA-134a propellants.
Figure 2:
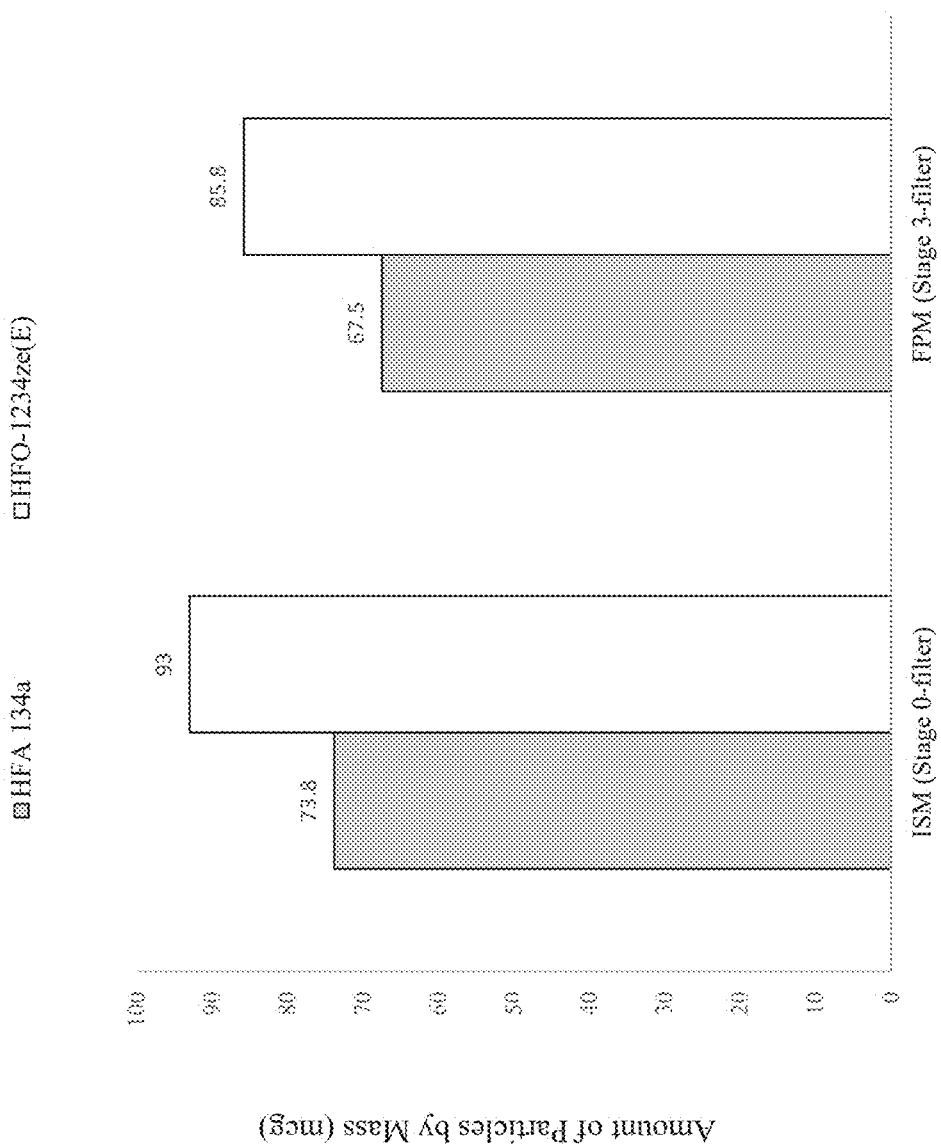
FIG. 2 is a chart comparing impactor-sized mass (ISM) and fine particle mass (FPM) of Epinephrine-HFO and Epinephrine-HFA formulations.

Applicants have surprisingly discovered that at the same epinephrine concentration and excipients, without an antioxidant in the HFO formulation, the formulations of the disclosure can produce a higher FPM compared to Primatene MIST® HFA, and fewer particles are left on the actuator and throat as presented in Table 1-1 and FIGS. 1 and 2. Therefore, the formulations in HFO-1234ze(E) could be adjusted with a lower drug concentration to achieve the same strength and efficacy. The aerosol suspensions contain 0.10% to 0.50% by weight, preferably 0.20% to 0.30% by weight, and more preferably 0.25% to 0.27% by weight of epinephrine relative to the total weight of the suspension.

Without being bound by theory, it is thought that the formulations of the disclosure provide at least the following advantages compared to the Primatene MIST® HFA formulation:

the epinephrine suspension formulations utilize the more environmentally friendly HFO propellant to fulfill the requirements of the Montreal Protocol while maintaining comparable efficacy and safety effects of the previous epinephrine HFA formulation; and the epinephrine HFO formulations have fewer total impurities than the HFA formulation during storage and use—without the addition of an antioxidant—providing a basis for the drug to meet storage requirements of good manufacturing practice (GMP) and reducing any risks of adverse events caused by a higher level of impurities.

The general description and the following detailed description are exemplary and explanatory only and are not restrictive of the invention, as defined in the appended claims. Other aspects of the present invention will be apparent to those skilled in the art in view of the detailed description of the invention as provided herein.

For clarity of disclosure, and not by way of limitation, the detailed description of the invention is divided into subsections that describe or illustrate certain features, embodiments, or applications of the present invention.

Definitions

Unless defined otherwise, all technical and scientific terms used herein have the same meaning as commonly understood by one of ordinary skill in the art to which this invention belongs. Although any methods and materials similar or equivalent to those described herein can also be used in the practice or testing of the present invention, representative illustrative methods, and materials are now described.

All publications and patents cited in this specification are herein incorporated by reference as if each individual publication or patent were specifically and individually indicated to be incorporated by reference and are incorporated herein by reference to disclose and describe the methods and/or materials in connection with which the publications are cited. The citation of any publication is for its disclosure prior to the filing date and should not be construed as an admission that the present invention is not entitled to antedate such publication by virtue of prior invention. Further, the dates of publication provided may be different from the actual publication dates, which may need to be independently confirmed.

It is noted that, as used herein and in the appended claims, the singular forms "a," "an," and "the" include plural referents unless the context clearly dictates otherwise. It is further noted that the claims may be drafted to exclude any optional element. As such, this statement is intended to serve as antecedent basis for use of such exclusive terminology as "solely," "only" and the like in connection with the recitation of claim elements, or use of a "negative" limitation.

Each of the individual embodiments described and illustrated herein has discrete components and features which may be readily separated from or combined with the features of any of the other several embodiments without departing from the scope or spirit of the present invention. Any recited method can be carried out in the order of events recited or in any other order which is logically possible.

As used herein, the term "about" when referring to a measurable value such as an amount, a temporal duration, and the like, is meant to encompass variations of ±20% or ±10%, more preferably ±5%, even more preferably ±1%, and still more preferably ±0.1% from the specified value, as such variations are appropriate to perform the disclosed methods.

It is also to be understood that the terminology used herein is for the purpose of describing particular embodiments only and is not intended to be limiting.

As used herein, the terms "comprising," "including," "containing" and "characterized by" are exchangeable, inclusive, open-ended and do not exclude additional, unrecited elements or method steps. Any recitation herein of the term "comprising," particularly in a description of components of a composition or in a description of elements of a device, is understood to encompass those compositions and methods consisting essentially of and consisting of the recited components or elements.

Throughout this specification, unless the context requires otherwise, the word "comprise" or variations such as "comprises" or "comprising," will be understood to imply the inclusion of a stated integer or group of integers but not the exclusion of any other integer or group of integers.

As used herein, the term "consisting of" excludes any element, step, or ingredient not specified in the claim element.

Before certain embodiments are described in greater detail, it is to be understood that this invention is not limited to certain embodiments described, as such may, of course, vary. It is also to be understood that the terminology used herein is for the purpose of describing certain embodiments only, and is not intended to be limiting, since the scope of the present invention will be limited only by the appended claims.

Where a range of values is provided, it is understood that each intervening value, to the tenth of the unit of the lower limit unless the context clearly dictates otherwise, between the upper and lower limit of that range and any other stated or intervening value in that stated range, is encompassed within the invention. The upper and lower limits of these smaller ranges may independently be included in the smaller ranges and are also encompassed within the invention, subject to any specifically excluded limit in the stated range. Where the stated range includes one or both of the limits, ranges excluding either or both of those included limits are also included in the invention.

It is also to be understood that the terminology used herein is for the purpose of describing particular embodiments only and is not intended to be limiting.

A "subject" or "patient," as used therein, may be a human or non-human mammal. Non-human mammals include, for example, livestock and pets, such as ovine, bovine, porcine, canine, feline and murine mammals. Preferably, the subject is a human.

As used herein, and as well-understood in the art, "treatment" is an approach for obtaining beneficial or desired results, including clinical results. For purposes of this invention, beneficial or desired clinical results include, but are not limited to, alleviation or amelioration of one or more symptoms, diminishment of extent of disease, stabilized (i.e., not worsening) state of disease, preventing spread of disease, delay or slowing of disease progression, amelioration or palliation of the disease state, and remission (whether partial or total), whether detectable or undetectable. "Treatment" can also mean prolonging survival as compared to expected survival if not receiving treatment.

As used herein the term "HFO" refers to hydrofluoroolefin. The term "HFOs" refers to hydrofluoroolefins.

As used herein, the term "HFO-1234ze" refers to 1,3,3,3-tetraflouropropene or trans-1,3,3,3-tetraflouropropene or trans-HFOze. The structure of HFO-1234ze is shown in Table 1-1 below. Furthermore, as used herein "HFO-1234ze (E)" is synonymous with "HFO-1234ze".

As used herein, the term "MDI" refers to a metered dose inhaler.

Pharmaceutical Aerosol Formulations

One aspect of the disclosure is directed to pharmaceutical aerosol formulations for use with a pressurized metered dose inhaler that contain epinephrine or a pharmaceutically acceptable salt thereof, as the active pharmaceutical ingredient (API) and a pressurized, liquefied propellant contain a hydrofluoroolefin (HFO).

In certain embodiments, the inhalable pharmaceutical suspension aerosol includes epinephrine as the active pharmaceutical ingredient, a surfactant, a co-solvent, and a propellant of hydrofluoroolefin. The active ingredient of micronized epinephrine or its salt forms is generally present in a therapeutically effective amount to exert the intended therapeutic action.

In certain embodiments, the suspension aerosol is administered from a pressurized metered-dose inhaler (MDI) having a canister, a valve, an actuator, and a dose indicator. In one embodiment, the canister is an aluminum anodized canister. In another embodiment, the canister is an aluminum plasma coated canister.

In certain embodiments, these formulations are based on the surprising discovery that at the same epinephrine concentration and excipients, without an antioxidant in the HFO formulation, the formulations of the disclosure can produce a higher FPM compared to the Primatene MIST® HFA, and fewer particles are left on the actuator and throat as presented in Table 1-1 and FIGS. 1 and 2. Therefore, the formulation in HFO-1234ze(E) could be adjusted with a lower drug concentration to achieve the same strength and efficacy.

One embodiment of the disclosure is a pharmaceutical aerosol formulation for use with a pressurized metered dose inhaler containing: a suspension formulation of pre-micronized epinephrine free base or a pharmaceutically acceptable salt thereof; a pressurized, liquefied propellant comprising a hydrofluoroolefin; a co-solvent; and a surfactant in an amount not more than about 0.2% (w/w) relative to the total weight of the formulation.

In certain embodiments, the aerosol suspension (i.e., the pharmaceutical aerosol formulation) contains from about 0.10% to about 0.50% by weight, preferably from about 0.20% to about 0.30% by weight, and more preferably from about 0.25% to about 0.27% by weight of epinephrine relative to the total weight of the suspension.

The formulations of the disclosure contain epinephrine as the active pharmaceutical ingredient (API) with a dose strength from about 40 mcg to about 250 mcg, in particular, in the range of from about 90 mcg to about 175 mcg, alternatively from about 75 mcg to about 125 mcg. In one embodiment, the preferred epinephrine dose strength is in the range of from about 100 mcg to about 150 mcg.

The particle size of the particular (e.g., micronized) epinephrine or its salt forms should be such as to permit inhalation of substantially all the drug into the lungs upon administration of aerosol formulation and will thus be less than 100 μm, desirably less than 20 μm, and, in particular, in the range of from about 1 μm to about 10 μm, e.g., from about 1 μm to about 5 μm, alternatively from about 2 μm to about 4 μm. In certain embodiments, the preferred particle size of the micronized epinephrine is from about 2 to about 3 μm.

The pharmaceutical aerosol formulations contain hydrofluoroolefin (HFO) as the propellant to deliver the drug molecules to the lungs. HFO may be present in amounts ranging from about 91% to about 99% w/w, alternatively from about 93% to about 99% w/w, alternatively from about 94% to about 99% w/w, alternatively from about 95% to about 99% w/w, alternatively from about 96% to about 99% w/w, alternatively from about 97% to about 99% w/w, alternatively from about 98% to about 99% w/w, alternatively from about 91% to about 99.5% w/w, alternatively from about 94% to about 99.5% w/w, relative to the total weight of the aerosol formulation.

The preferred propellant is HFO-1234ze(E). The amount of HFO-1234ze(E) in the formulation can range from about 91% to about 99% w/w, alternatively from about 91% to about 99.5% w/w, alternatively from about 94% to about 99.5% w/w, relative to the total weight of the aerosol formulation. In some embodiments, the HFO-1234ze(E) amount ranges from about 98% to about 99% w/w relative to the total weight of the aerosol formulation.

The co-solvent utilized in the formulation can be selected from ethyl alcohol, isopropyl alcohol, propylene glycol, ethylene glycol, propane, butane, isobutene, pentane, dimethyl ether, diethyl ether, and a combination thereof. The amount of co-solvent present in the formulations ranges from about 0.1% to about 8% w/w, alternatively from about 0.1% to about 5% w/w, alternatively from about 0.5% to about 1.5% w/w relative to the total weight of the aerosol formulation. In certain embodiments, the co-solvent is present in an amount of not more than about 8% (w/w) relative to the total weight of the formulation. Without being bound by theory, a co-solvent is added to the formulations to help solubilize the surfactant and to improve the dispersion characteristics of the micronized epinephrine particles.

Preferably, the co-solvent selected is ethanol. An increase of ethanol co-solvent in the aerosol formulation may lead to a decrease in vapor pressure in the pressurized MDI system and causes a smaller amount of drug to deposit in the deep lung. The ethanol is present in the formulation in an amount ranging from about 0.1% to about 8% w/w, alternatively from about 0.5% to about 5% w/w relative to the total weight of the formulation. The preferred ethanol amount is from about 0.1% to about 5% w/w relative to the total weight of the aerosol formulation, more preferably from about 0.5% to about 1.5% w/w relative to the total weight of the aerosol formulation.

The formulations contain a surfactant. In certain embodiments, the surfactant is selected from the group consisting of polysorbates, polyethylene glycol, oleic acid, lecithin, and a combination thereof. Alternatively, the surfactant can be selected from the group of oleic acid, lecithin, polyethylene glycol, polysorbate, and a combination thereof. Alternatively, the surfactant can be selected from the group of oleic acid, lecithin, polyethylene glycol 1000 (PEG1000), polysorbate 80, and a combination thereof. In one embodiment, a combination of polyethylene glycol (e.g., PEG1000) and polysorbate (e.g., polysorbate 80) are used. In certain embodiments, only a small amount of surfactant, less than about 0.3% w/w of the total weight of the aerosol formulation, alternatively not more than about 0.2% w/w relative to the total weight of the aerosol formulation, alternatively more than about 0.02% w/w relative to the total weight of the aerosol formulation is present. In other embodiments, the formulations contain from about 0.02% to about 0.3% w/w, alternatively from about 0.03% to about 0.3% w/w, alternatively from about 0.03% to about 0.2% w/w relative to the total weight of the aerosol formulation.

In some embodiments, the preferred surfactant is polysorbate 80 (T80). In some embodiments, T80 is present in an amount of not more than about 0.2% w/w relative to the total weight of the aerosol formulation. In other embodiments, the preferred T80 amount is about 0.02% w/w relative to the total weight of the aerosol formulation.

Without being bound by theory, the amount of surfactant is thought to be to improve the suspension stability. Furthermore, without being bound by theory, the surfactant is included in the formulation to improve the physical stability of the formulation and ensure consistent delivery of medication from the pressurized MDI by coating the microparticles, which, in turn, prevents agglomeration of the particles, prevents adhesion of the particles to container walls, and provides lubrication for valve components in the MDI.

The formulations of the disclosure do not require the addition of an antioxidant, i.e., epinephrine formulations without an antioxidant (devoid of an antioxidant). Accordingly, the formulations of the disclosure do not comprise or do not contain an antioxidant; they are antioxidant-free or without an antioxidant. In certain embodiments, the formulations do not comprise or do not contain an antioxidant selected from the group consisting of thymol, tocopherol, ascorbyl palmitate, butylated hydroxyanisole, butylated hydroxytoluene, propyl gallate, citric acid, sodium metabisulfite, sodium sulfite, and a combination thereof.

An antioxidant was added to Primatene MIST® HFA to improve stability and therefore minimize the formation of impurities over a period of time. The formulations of the disclosure, however, demonstrated having fewer total impurities over the same period of time without using an antioxidant as shown in Examples below (see e.g., Table 7-1). The drug delivery efficiency after storage was also determined which exhibited the epinephrine suspension HFO-1234ze(E) formulation, without an antioxidant, as being comparable to the Primatene MIST® HFA formulation with an antioxidant when measuring their changes in FPF and MMAD after storage as shown in the Examples below (see e.g., Table 8-1).

In one embodiment, the pharmaceutical aerosol formulation contains an effective amount of pre-micronized epinephrine or its salt form in an amount ranging from about 0.10% to about 0.50% w/w with a particle size of less than about 5 µm, trans-1,3,3,3-tetrafluoropropene (HFO-1234ze (E)) propellant in an amount of about 91% w/w or more, ethanol in an amount ranging from about 0.1% to about 8.0% w/w, and polysorbate 80 in an amount of not more than 0.2% w/w relative to the total weight of the aerosol formulation.

In an alternate embodiment, the pharmaceutical aerosol formulation contains: a suspension formulation of pre-micronized epinephrine free base or a pharmaceutically acceptable salt thereof in an amount of from about 0.10% to about 0.50% (w/w) relative to the total weight of the formulation; HFO-1234ze(E) present in an amount of 91% to 99% (w/w) relative to the total weight of the formulation; not more than 8% (w/w) of ethanol relative to the total weight of the formulation; and a polysorbate (e.g., polysorbate 80) in an amount not more than 0.2% (w/w) relative to the total weight of the formulation.

In a further embodiment, the pharmaceutical aerosol formulation contains: a suspension formulation of pre-micronized epinephrine free base or a pharmaceutically acceptable salt thereof in an amount of from about 0.25% to about 0.27% (w/w) relative to the total weight of the formulation; HFO-1234ze(E) present in an amount of from about 98% to about 99% (w/w) relative to the total weight of the formulation; not more than 8% (w/w) of ethanol relative to the total weight of the formulation; and polysorbate 80 in an amount not more than 0.2% (w/w) relative to the total weight of the formulation.

In another embodiment, the pharmaceutical aerosol formulation contains an effective amount of pre-micronized epinephrine or its salt form in an amount ranging from about 0.25% to about 0.27% w/w with a particle size ranging from about 2 µm to about 3 µm, trans-1,3,3,3-tetrafluoropropene (HFO-1234ze(E)) propellant in an amount ranging from 98% to 99% w/w, ethanol in an amount ranging from about 0.5% to about 1.5% w/w, and polysorbate 80 in an amount not more than about 0.02% w/w relative to the total weight of the aerosol formulation.

Accordingly, in one embodiment, pharmaceutical aerosol formulation for use with a pressurized metered dose inhaler (MDI) contains: a suspension formulation of pre-micronized epinephrine free base or a pharmaceutically acceptable salt thereof; a pressurized, liquefied propellant comprising a hydrofluoroolefin (HFO) present in an amount of from about 91% to about 99% (w/w) relative to the total weight of the formulation; a co-solvent not more than about 8% (w/w) relative to the total weight of the formulation; and a surfactant in an amount not more than about 0.2% (w/w) relative to the total weight of the formulation.

Yet another embodiment of the disclosure is a pharmaceutical aerosol formulation for use with a pressurized metered dose inhaler containing:

(a) pre-micronized epinephrine free base (having a particle size of less than about 5 µm, alternatively from about 2 µm to about 3 µm in diameter) suspended in a surfactant-alcoholic solution in an amount of from about 0.10% to about 0.50% (w/w), alternatively, from about 0.25 to about 0.27% (w/w) relative to the total weight of the formulation;

(b) a hydrofluoroolefin propellant, environmentally sustainable trans-1,3,3,3-tetrafluoropropene (HFO-1234ze (E)) in an amount of about 91% or more, alternatively from about 98% to about 99% (w/w) relative to the total weight of the formulation;

(c) an alcohol as a co-solvent in an amount of from about 0.1 to about 8.0% (w/w), alternatively 0.5% to 1.5% (w/w) relative to the total weight of the formulation; and (d) polysorbate 80 as a surfactant in an amount of no more than about 0.2% (w/w), alternatively no more than about 0.02% (w/w) relative to the total weight of the formulation.

Tables A-F show exemplary formulations of the disclosure. The various amounts for the embodiments can be combined. For example, an exemplary formulation of the disclosure can contain the embodiment 1 amount of epinephrine of Table A and the co-solvent amount of embodiment 2 of Table A, etc.

TABLE A

Exemplary pharmaceutical aerosol formulations of the disclosure

| | Embodiment 1 | Embodiment 2 | Embodiment 3 |
|---|---|---|---|
| suspension formulation of pre-micronized epinephrine free base or a pharmaceutically acceptable salt thereof | from about 0.10% to about 0.50% rtwf | from about 0.20% to about 0.30% rtwf | from about 0.25% to about 0.27% rtwf |

TABLE A-continued

Exemplary pharmaceutical aerosol formulations of the disclosure

| | Embodiment 1 | Embodiment 2 | Embodiment 3 |
|---|---|---|---|
| epinephrine dose strength | from about 40 mcg to about 250 mcg | from about 90 mcg to about 175 mcg | from about 100 mcg to about 150 mcg |
| epinephrine particle size | from about 1 μm to about 10 μm | from about 1 μm to about 5 μm | from about 2 to about 3 μm |
| pressurized, liquefied propellant comprising a hydrofluoroolefin (HFO) | from about 91% to about 99% w/w rtwf | from about 95% to about 99% w/w rtwf | from about 98% to about 99% w/w rtwf |
| a co-solvent selected from the group consisting of ethyl alcohol, isopropyl alcohol, propylene glycol, ethylene glycol, propane, butane, isobutene, pentane, dimethyl ether, diethyl ether, and a combination thereof | from about 0.1% to about 8% w/w rtwf | from about 0.1% to about 5% w/w rtwf | from about 0.5% to about 1.5% w/w rtwf |
| a surfactant selected from the group consisting of polysorbates, polyethylene glycol, oleic acid, lecithin, and a combination thereof | less than about 0.3% w/w rwtf | not more than about 0.2% w/w rwtf | not more than about 0.02% w/w rwtf |

As used herein "rwtf" means relative to the total weight of the aerosol formulation

TABLE B

Exemplary pharmaceutical aerosol formulations of the disclosure

| | Embodiment 4 | Embodiment 5 | Embodiment 6 |
|---|---|---|---|
| suspension formulation of pre-micronized epinephrine free base or a pharmaceutically acceptable salt thereof | from about 0.10% to about 0.50% rtwf | from about 0.20% to about 0.30% rtwf | from about 0.25% to about 0.27% rtwf |
| epinephrine dose strength | from about 40 mcg to about 250 mcg | from about 90 mcg to about 175 mcg | from about 100 mcg to about 150 mcg |
| epinephrine particle size | from about 1 μm to about 10 μm | from about 1 μm to about 5 μm | from about 2 to about 3 μm |
| HFO-1234ze(E) | from about 91% to about 99% w/w rtwf | from about 95% to about 99% w/w rtwf | from about 98% to about 99% w/w rtwf |
| a co-solvent selected from the group consisting of ethyl alcohol, isopropyl alcohol, propylene glycol, ethylene glycol, propane, butane, isobutene, pentane, dimethyl ether, diethyl ether, and a combination thereof | from about 0.1% to about 8% w/w rtwf | from about 0.1% to about 5% w/w rtwf | from about 0.5% to about 1.5% w/w rtwf |
| a surfactant selected from the group consisting of polysorbates, polyethylene glycol, oleic acid, lecithin, and a combination thereof | less than about 0.3% w/w rwtf | not more than about 0.2% w/w rwtf | not more than about 0.02% w/w rwtf |

As used herein "rwtf" means relative to the total weight of the aerosol formulation

TABLE C

Exemplary pharmaceutical aerosol formulations of the disclosure

|  | Embodiment 7 | Embodiment 8 | Embodiment 9 |
|---|---|---|---|
| suspension formulation of pre-micronized epinephrine free base or a pharmaceutically acceptable salt thereof | from about 0.10% to about 0.50% rtwf | from about 0.20% to about 0.30% rtwf | from about 0.25% to about 0.27% rtwf |
| epinephrine dose strength | from about 40 mcg to about 250 mcg | from about 90 mcg to about 175 mcg | from about 100 mcg to about 150 mcg |
| epinephrine particle size | from about 1 µm to about 10 µm | from about 1 µm to about 5 µm | from about 2 to about 3 µm |
| HFO-1234ze(E) | from about 91% to about 99% w/w rtwf | from about 95% to about 99% w/w rtwf | from about 98% to about 99% w/w rtwf |
| ethanol | from about 0.1% to about 8% w/w rtwf | from about 0.1% to about 5% w/w rtwf | from about 0.5% to about 1.5% w/w rtwf |
| polysorbate (e.g., polysorbate 80) | less than about 0.3% w/w rwtf | not more than about 0.2% w/w rwtf | not more than about 0.02% w/w rwtf |

As used herein "rwtf" means relative to the total weight of the aerosol formulation

TABLE D

Exemplary pharmaceutical aerosol formulations of the disclosure

|  | Embodiment 10 | Embodiment 11 | Embodiment 12 |
|---|---|---|---|
| suspension formulation of pre-micronized epinephrine free base or a pharmaceutically acceptable salt thereof | from about 0.10% to about 0.50% rtwf | from about 0.20% to about 0.30% rtwf | from about 0.25% to about 0.27% rtwf |
| epinephrine dose strength | from about 40 mcg to about 250 mcg | from about 90 mcg to about 175 mcg | from about 100 mcg to about 150 mcg |
| epinephrine particle size | from about 1 µm to about 10 µm | from about 1 µm to about 5 µm | from about 2 to about 3 µm |
| pressurized, liquefied propellant comprising an HFO | from about 91% to about 99% w/w rtwf | from about 95% to about 99% w/w rtwf | from about 98% to about 99% w/w rtwf |
| a co-solvent selected from the group consisting of ethyl alcohol, isopropyl alcohol, propylene glycol, ethylene glycol, propane, butane, isobutene, pentane, dimethyl ether, diethyl ether, and a combination thereof | from about 0.1% to about 8% w/w rtwf | from about 0.1% to about 5% w/w rtwf | from about 0.5% to about 1.5% w/w rtwf |
| a surfactant selected from the group consisting of polysorbates, polyethylene glycol, oleic acid, lecithin, and a combination thereof | less than about 0.3% w/w rwtf | not more than about 0.2% w/w rwtf | not more than about 0.02% w/w rwtf |
| antioxidant or antioxidant selected from the group consisting of thymol, tocopherol, ascorbyl palmitate, butylated hydroxyanisole, butylated hydroxytoluene, propyl gallate, citric acid, sodium metabisulfite, sodium sulfite, and a combination thereof | Not present | Not present | Not present |

As used herein "rwtf" means relative to the total weight of the aerosol formulation

TABLE E

Exemplary pharmaceutical aerosol formulations of the disclosure

| | Embodiment 13 | Embodiment 14 | Embodiment 15 |
|---|---|---|---|
| suspension formulation of pre-micronized epinephrine free base or a pharmaceutically acceptable salt thereof | from about 0.10% to about 0.50% rtwf | from about 0.20% to about 0.30% rtwf | from about 0.25% to about 0.27% rtwf |
| epinephrine dose strength | from about 40 mcg to about 250 mcg | from about 90 mcg to about 175 mcg | from about 100 mcg to about 150 mcg |
| epinephrine particle size | from about 1 μm to about 10 μm | from about 1 μm to about 5 μm | from about 2 to about 3 μm |
| HFO-1234ze(E) | from about 91% to about 99% w/w rtwf | from about 95% to about 99% w/w rtwf | from about 98% to about 99% w/w rtwf |
| a co-solvent selected from the group consisting of ethyl alcohol, isopropyl alcohol, propylene glycol, ethylene glycol, propane, butane, isobutene, pentane, dimethyl ether, diethyl ether, and a combination thereof | from about 0.1% to about 8% w/w rtwf | from about 0.1% to about 5% w/w rtwf | from about 0.5% to about 1.5% w/w rtwf |
| a surfactant selected from the group consisting of polysorbates, polyethylene glycol, oleic acid, lecithin, and a combination thereof | less than about 0.3% w/w rwtf | not more than about 0.2% w/w rwtf | not more than about 0.02% w/w rwtf |
| antioxidant or antioxidant selected from the group consisting of thymol, tocopherol, ascorbyl palmitate, butylated hydroxyanisole, butylated hydroxytoluene, propyl gallate, citric acid, sodium metabisulfite, sodium sulfite, and a combination thereof | Not present | Not present | Not present |

As used herein "rwtf" means relative to the total weight of the aerosol formulation

TABLE F

Exemplary pharmaceutical aerosol formulations of the disclosure

| | Embodiment 16 | Embodiment 17 | Embodiment 18 |
|---|---|---|---|
| suspension formulation of pre-micronized epinephrine free base or a pharmaceutically acceptable salt thereof | from about 0.10% to about 0.50% rtwf | from about 0.20% to about 0.30% rtwf | from about 0.25% to about 0.27% rtwf |
| epinephrine dose strength | from about 40 mcg to about 250 mcg | from about 90 mcg to about 175 mcg | from about 100 mcg to about 150 mcg |
| epinephrine particle size | from about 1 μm to about 10 μm | from about 1 μm to about 5 μm | from about 2 to about 3 μm |
| HFO-1234ze(E) | from about 91% to about 99% w/w rtwf | from about 95% to about 99% w/w rtwf | from about 98% to about 99% w/w rtwf |
| ethanol | from about 0.1% to about 8% w/w rtwf | from about 0.1% to about 5% w/w rtwf | from about 0.5% to about 1.5% w/w rtwf |
| polysorbate (e.g., polysorbate 80) | less than about 0.3% w/w rwtf | not more than about 0.2% w/w rwtf | not more than about 0.02% w/w rwtf |
| antioxidant or antioxidant selected from the group consisting of thymol, tocopherol, ascorbyl palmitate, butylated hydroxyanisole, butylated | Not present | Not present | Not present |

TABLE F-continued

Exemplary pharmaceutical aerosol formulations of the disclosure

|  | Embodiment 16 | Embodiment 17 | Embodiment 18 |
|---|---|---|---|
| hydroxytoluene, propyl gallate, citric acid, sodium metabisulfite, sodium sulfite, and a combination thereof | | | |

As used herein "rwtf" means relative to the total weight of the aerosol formulation In certain embodiments, the formulations have about 0.3% of total impurities or about 0.12% of ESA after storage for three-months at 40° C., 75% relative humidity. In other embodiments, the formulations have a difference of about 0.06% of total impurities after storage for three-months at 40° C., 75% relative humidity. In further embodiments, the formulations have not more than 0.12% of total impurities, and/or not more than 0.30% of ESA after storage for three-months at 40° C., 75% relative humidity.

Without further description, it is believed that one of ordinary skill in the art can, using the preceding description and the following illustrative examples, make and utilize the present invention and practice the claimed methods. The following working examples, therefore, specifically point out the preferred embodiments of the present invention, and are not to be construed as limiting in any way the remainder of the disclosure.

EXAMPLES

Example 1: Epinephrine Suspension Formulations with HFO-1234ze(E) Propellant

Despite structural differences, HFO-1234ze, HFA-134a and HFA-227 have similar physical properties (density, vapor pressure, moisture solubility, dipole moment) (see Table 1-1) leading to the hypothesis that HFO-1234ze may be a suitable alternative for pressurized MDI formulations. To determine if HFO-1234ze is indeed a suitable alternative, an epinephrine suspension formulation containing HFO-1234ze(E) was generated and compared to the Primatene MIST® HFA formulation in HFA-134a by Andersen Cascade Impaction analysis.

TABLE 1-1

Physicochemical and Environmental Properties of HFA and HFO Propellants

|  | Propellant | HFA-134a | HFA-227 | HFO-1234ze(E) |
|---|---|---|---|---|
| Chemical Properties | Chemical Name and Structure | 1,1,1,2-Tetrafluoroethane | 1,1,1,2,3,3,3-Heptafluoropropane | Trans-1,3,3,3-Tetrafluoropropene |
| | MW | 102.0 | 170.0 | 114.0 |
| | Liquid Density at 20° C. (g/mL) | 1.21 | 1.41 | 1.19 |
| | Dipole Moment (debye) | 2.06 | 0.93 | 1.44 |
| | Boiling Point (° C.) | −25.8 | −17.3 | −19.0 |
| | Vapor Pressure at 20° C. (psi) | 83.0 | 56.6 | 46.4 |
| | Water solubility (ppm) | 2220 at 25° C. | 610 at 25° C. | 225 at 20° C. |
| | Log P (octanol/water) | 1.1 | 2.1 | 1.3 |
| Environmental Effects | Ozone Depletion Potential | 0 | 0 | 0 |
| | Atmospheric Life | 14.6 years | 36.5 years | 16.4 days |
| | Global Warming Potential | 1300 | 2900 | 6 |

Applicants have surprisingly discovered that at the same epinephrine concentration and excipients, without an antioxidant in the HFO formulation, the present invention is capable of producing a higher FPM compared to the Primatene MIST® HFA, and fewer particles are left on the actuator and throat as presented in Table 1-2 and FIGS. 1 and 2. Therefore, the formulation in HFO-1234ze(E) could be adjusted with a lower drug concentration to achieve the same strength and efficacy.

TABLE 1-2

Respirable Drug Delivery Assessment of Epinephrine Inhalation in HFO-1234ze(E) vs HFA 134a
Epinephrine Suspension MDI

| Propellant | | HFA 134a | HFO-1234ze(E) |
|---|---|---|---|
| Formulation | | 0.2732% w/w API 1% w/w EtOH 0.02% w/w T80 0.01% w/w thymol | 0.2732% w/w API 1% w/w EtOH 0.02% w/w T80 |
| Andersen Cascade Impactor Data, Mass, mcg | | | |
| Total from Throat to filter | Aerosol | 127.6 | 136.4 |
| Actuator | Size, μm | 29.6 | 24.2 |
| Throat | | 53.8 | 43.2 |
| Total 3-5 | 1.1-4.7 μm | 64.8 | 82.8 |
| CPM (Throat-stage 2) | >4.7 μm | 60.1 | 50.4 |
| EPM (Stage 6-filter) | ≤1.1 μm | 2.7 | 3.1 |
| ISM (Stage 0-filter) | | 73.8 | 93.2 |
| FPM (Stage 3-filter) | ≤4.7 μm | 67.5 | 85.9 |
| MMAD (μm) | | 2.66 | 2.73 |
| GSD | | 1.50 | 1.48 |

Example 1 demonstrates that it is possible to use HFO-1234ze(E) propellant in place of HFA-134a. Further studies on HFO-1234 containing formulations were conducted. The results of studies investigating HFO-1234 formulations are shown in Examples 3 to 8.

Example 2: Epinephrine Suspension Formulations with HFO-1234ze(E) Propellant

In view of the favorable results in Example 1, a series of epinephrine aerosol suspension formulations in HFO-1234ze(E) was studied. Each formulation contains an epinephrine free base in a strength ranging from 90 mcg to 175 mcg (such as from 0.19% to 0.32%, w/w), from about 0.1% to about 8% w/w of ethanol (EtOH), from 0% to about 0.3% w/w of a surfactant, and from about 91% to about 99% w/w of an HFO-1234ze(E) propellant. The contents of the formulations are shown in Table 2-1 below. These formulations were subsequently studied in Examples 3 to 8.

TABLE 2-1

Epinephrine Aerosol Suspension Examples

| Formulation | Micronized Epinephrine Base, % w/w | EtOH, % w/w | Surfactant, % w/w | HFO-1234ze(E) % w/w | API Strength |
|---|---|---|---|---|---|
| 1 | 0.19 | 1 | T80, 0.02 | 98.79 | 90 mcg |
| 2 | 0.21 | 1 | T80, 0.02 | 98.77 | 100 mcg |
| 3 | 0.26 | 1 | T80, 0.02 | 98.72 | 125 mcg |
| 4 | 0.30 | 1 | T80, 0.02 | 98.68 | 150 mcg |
| 5 | 0.32 | 1 | T80, 0.02 | 98.66 | 175 mcg |
| 6 | 0.26 | 0.1 | none | 99.64 | 125 mcg |
| 7 | 0.26 | 0.5 | T80, 0.02 | 99.22 | 125 mcg |
| 8 | 0.26 | 2 | T80, 0.02 | 97.72 | 125 mcg |
| 9 | 0.26 | 3 | T80, 0.02 | 96.72 | 125 mcg |
| 10 | 0.26 | 5 | T80, 0.02 | 94.72 | 125 mcg |
| 11 | 0.26 | 7.5 | T80, 0.03; PEG1000, 0.30 | 91.91 | 125 mcg |
| 12 | 0.26 | 8 | T80, 0.02; PEG1000, 0.20 | 91.52 | 125 mcg |
| 13 | 0.26 | 1 | T80, 0.10 | 98.64 | 125 mcg |
| 14 | 0.26 | 1 | T80, 0.20 | 98.54 | 125 mcg |
| 15 | 0.26 | 5 | Lecithin, 0.20 | 94.54 | 125 mcg |
| 16 | 0.26 | 5 | Oleic Acid 0.20 | 94.54 | 125 mcg |

Formulations 1-5 (see Table 2-1)

Formulation 1 contains 0.19% w/w micronized epinephrine base with a particle size of 2.0-3.0 μm in terms of volume mean diameter (VMD), 1% w/w EtOH, 0.02% w/w polysorbate 80 (T80), and 98.79% w/w HFO-1234ze(E), which was prepared by:
(1) Premixing EtOH and polysorbate 80 (1:0.02 w/w);
(2) Adding 22.2 mg micronized epinephrine and 0.1193 g EtOH/T80 solution from step (1) into a 14 mL aluminum anodized canister and crimping a 50 μL valve on it; and
(3) Pressurized filling about 11.56 g HFO-1234ze(E) into the canister to make an 11.7 g epinephrine suspension. Mix and sonicate in an ice bath for 30 minutes.

The formulation is suitable for delivering 90 μg epinephrine per actuation.

Formulations 2-5 were prepared in a manner similar to the procedure for Formulation 1 with the corresponding amounts of API and HFO. Each formulation is suitable for delivering its respective epinephrine dose per actuation.

Formulation 6 (see Table 2-1)

Formulation 6 contains 0.26% w/w micronized epinephrine base a with particle size of 2.0-3.0 μm (VMD), 0.1% w/w EtOH, and 99.64% w/w HFO-1234ze(E), which was prepared by:
(1) Adding 30.0 mg micronized epinephrine and 0.0117 g EtOH into a 14 mL aluminum anodized canister and crimping a 50 μL valve on it; and
(2) Pressurized filling of about 11.64 g HFO-1234ze(E) into the canister to make an 11.7 g epinephrine suspension. Mix and sonicate in an ice bath for 30 minutes.

The formulation is suitable for delivering 125 μg epinephrine per actuation.

Formulations 7-10 (see Table 2-1)

Formulation 7 contains 0.26% w/w micronized epinephrine base with particle size of 2.0-3.0 μm (VMD), 0.5% w/w EtOH, 0.02% w/w T80, and 99.22% w/w HFO-1234ze(E), which was prepared by
(1) Premixing EtOH and polysorbate 80 (0.5:0.02 w/w);
(2) Adding 30.0 mg micronized epinephrine and 0.1193 g EtOH/T80 solution from step (1) into a 14 mL aluminum anodized canister and crimping a 50 μL valve on it; and
(3) Pressurized filling about 11.61 g HFO-1234ze(E) into the canister to make an 11.7 g epinephrine suspension. Mix and sonicate in an ice bath for 30 minutes.

The formulation is suitable for delivering 125 μg epinephrine per actuation.

Formulations 8-10 were prepared in a manner similar to the procedure for Formulation 7 with the corresponding amounts of EtOH and HFO.

Formulations 11 and 12 (see Table 2-1)

Formulation 11 contains 0.26% w/w micronized epinephrine base with particle size of 2.0-3.0 μm (VMD), 7.5 w/w EtOH, 0.30% w/w PEG1000, 0.03% w/w T80, and 91.91% w/w HFO-1234ze(E), which was prepared by:
(1) Premixing EtOH, PEG1000, and T80 (7.5:0.3:0.02 w/w);
(2) Adding 30.0 mg micronized epinephrine and 0.9149 g EtOH/PEG1000/T80 solution from step (1) into a 14 mL aluminum anodized canister and crimping a 50 μL valve on it; and
(3) Pressurized filling of about 10.75 g HFO-1234ze(E) into the canister to make an 11.7 g epinephrine suspension. Mix and sonicate in an ice bath for 30 minutes.

The formulation is suitable for delivering 125 μg epinephrine per actuation.

Formulation 12 was prepared in a manner similar to the procedure for Formulation 11 with the corresponding amounts of EtOH, PEG 1000, T80, and HFO.

Formulations 13 and 14 (Table 2-1)

Formulation 13 contains 0.26% w/w micronized epinephrine base with particle size of 2.0-3.0 μm (VMD), 1.0% w/w EtOH, 0.10% w/w T80, and 98.64% w/w HFO-1234ze(E), which was prepared by:
(1) Premixing EtOH and T80 (1:0.1 w/w);
(2) Adding 30.0 mg micronized epinephrine and 0.1287 g EtOH/T80 solution from step (1) into a 14 mL aluminum anodized canister and crimping a 50 μL valve on it; and
(3) Pressurized filling of about 11.54 g HFO-1234ze(E) into the canister to make an 11.7 g epinephrine suspension. Mix and sonicate in an ice bath for 30 minutes.

The formulation is suitable for delivering 125 μg epinephrine per actuation.

Formulation 14 was prepared in a manner similar to the procedure for Formulation 13 with the corresponding amount of T80 and HFO.

Formulations 15 and 16 (see Table 2-1)

The formulations contain 0.26% w/w micronized epinephrine base with particle size of 2.0-3.0 μm (VMD), 5.0% w/w EtOH, 0.20% w/w oleic acid or lecithin, 94.54% w/w HFO-1234ze(E), which was prepared by:
(1) Premixing EtOH and lecithin solution (5:0.20 w/w) or premixing EtOH and oleic acid solution (5:0.20 w/w);
(2) Adding 30.0 mg micronized epinephrine and 0.6084 g EtOH/lecithin solution or 0.6084 g EtOH/oleic acid solution from step (1) into a 14 mL aluminum anodized canister and crimping a 50 μL valve on it; and
(3) Pressurized filling about 11.06 g HFO-1234ze(E) into the canister to make an 11.7 g epinephrine suspension. Mix and sonicate in an ice bath for 30 minutes.

These formulations are suitable for delivering 125 μg epinephrine per actuation.

Example 3: Respirable Drug Delivery Assessment of Epinephrine Suspension Formulations with HFO-1234ze(E) Propellant The therapeutic efficacy of an aerosol formulation is determined by the amount of the drug particles that can penetrate a patient's deeper lung region, which is evaluated by an in vitro Andersen Cascade Impactor. Andersen Cascade Impaction analysis coupled with an HPLC assay per USP <601>. Aerodynamic Size Distribution is for the evaluation of the fine particle fractions at different stages of the lung, which has eight stages simulating the various parts of the human respiratory system (the different regions of the lung). It utilizes jet stages to classify aerosols from 9.0 μm (stage 0) to 0.4 μm (stage 7) at the flow rate of 28.3 L/min and allows drug particles to impact stainless steel impaction plates. A filter located after stage 7 collects all particles smaller than 0.4 μm.

The size of the aerosol particles that enter the device can be categorized relative to which level they are deposited into:

All particles that enter the device, thereby passing the throat and actuator, from stage 0 to the filter are categorized as impactor-sized mass (ISM). The ISM is a measure of the total amount of the formulation that entered the system.

Particles that deposit in the Andersen Impactor throat to stage 2 are categorized as being of coarse particle mass (CPM) which represent particles that pass through the throat but collect in the upper airways due to their large size.

Particles that deposit in stage 3 to the filter are categorized as being of fine particle mass (FPM). The FPM range represents the particle size that is able to reach the respirable regions of the lung or the effective therapeutic regions. Having a higher FPM allows for a lower amount of total drug dose necessary to achieve equivalent therapeutic benefits.

Fine particle fraction (FPF) is a measure of the percentage of drug molecules deposited in the respirable regions of a patient's lungs ([Stage 3-filter]/Total). The FPF represents the efficiency of the respirable drug delivery.

Particles that deposit in stage 6 to the filter are categorized as being of extra-fine particle mass (EPM) which are particles that penetrate further into the respiratory tract.

The Mass Median Aerodynamic Diameter (MMAD) and Geometric Standard Deviation (GSD) are calculated based on the Andersen Cascade Impaction data and are used for the characterization of the aerodynamic size distribution of the drug particles.

The Andersen Cascade results of some epinephrine HFO-1234ze(E) suspension formulations are summarized and compared to the Primatene MIST® HFA formulation in HFA-134a in Tables 3-1 and Table 3-2. The formulations tested in this Example are the formulations described in Example 1 above.

Figure 3:
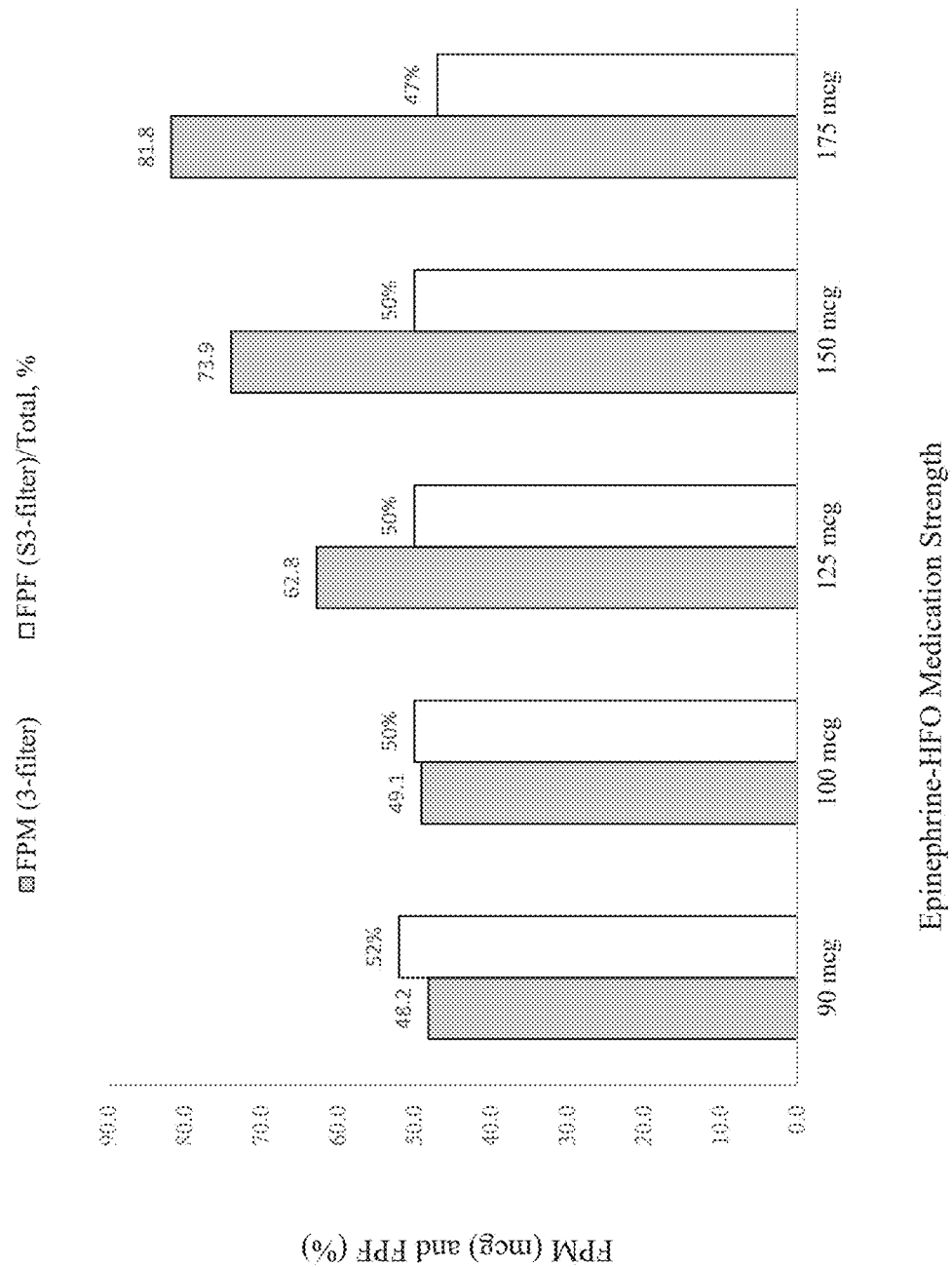
FIG. 3 is a chart showing a comparison of inhalable epinephrine/HFO-1234ze(E) formulations with dose strengths from 90 mcg to 175 mcg by FPM and fine particle fraction (FPF) of in vitro Andersen Cascade Impaction evaluation.
Figure 4:
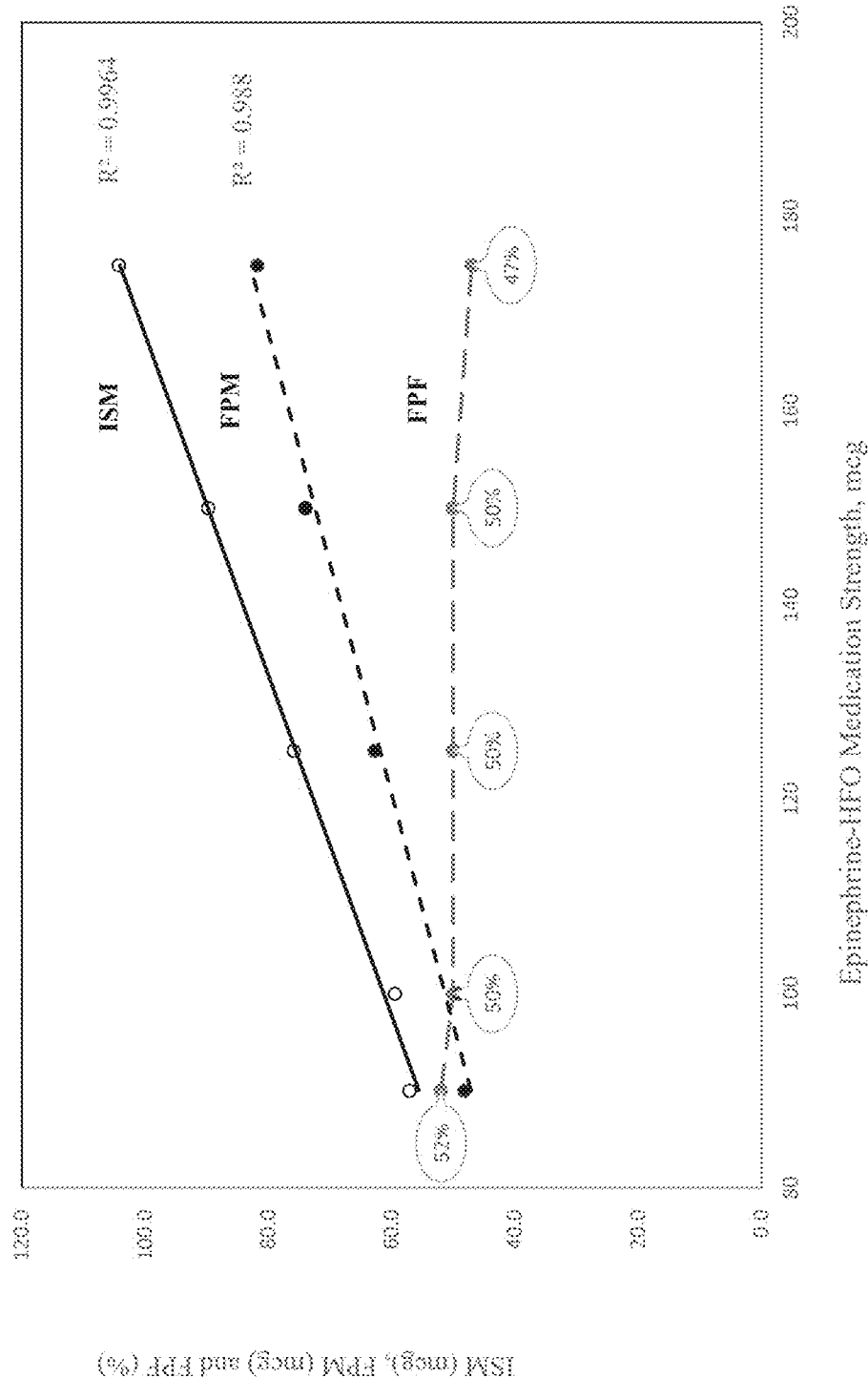
FIG. 4 is a chart showing the relationship between ISM vs Dose and FPM vs Dose as well as FPF vs Dose of inhalable epinephrine HFO-1234ze(E) formulations.

The Andersen Cascade Impaction results in Tables 3-1 and 3-2, Formulations 1-5, and FIG. 3 show that the ISM and FPM of the epinephrine suspension by pressurized MDI are higher when dose strength is higher. ISM-dose and FPM-dose graphs in FIG. 4 demonstrate that both ISM and FPM are directly proportional to dose strength: when dose strength increases, more particles penetrate the lung. Hence, the FPF, which is a measure of the formulation's drug delivery efficiency, is similar to each other for the dose range from 90 mcg to 175 mcg (see FIG. 4). Additionally, the MMAD and GSD of the epinephrine pressurized MDI formulation with the strength of 90 mcg-175 mcg were also similar to each other.

TABLE 3-1

Respirable Drug Delivery Assessment of Epinephrine Inhalation Formulations

|  |  | This Application |  |  |  |  |  | Primatene |
|---|---|---|---|---|---|---|---|---|
|  |  | Formulation No. |  |  |  |  |  | MIST ® |
|  | Type of | 1 | 2 | 3 | 4 | 5 | 7 | HFA |
| Dose | Strength, mcg | 90 | 100 | 125 | 150 | 175 | 125 | 125 |
| Formulation | Epinephrine, % | 0.19 | 0.21 | 0.26 | 0.30 | 0.32 | 0.26 | 0.1732 |
| (w/w) | HFA 134a, % | — | — | — | — | — | — | 98.8 |
|  | HFO 1234ze(E), % | 98.8 | 98.8 | 98.7 | 98.7 | 98.7 | 99.2 | — |
|  | Ethanol, % | 1 | 1 | 1 | 1 | 1 | 0.5 | 1 |
|  | Oleic Acid, % | — | — | — | — | — | — | — |
|  | Polysorbate 80, % | 0.02 | 0.02 | 0.02 | 0.02 | 0.02 | 0.02 | 0.02 |
|  | Lecithin, % | — | — | — | — | — | — | — |
|  | PEG1000, % | — | — | — | — | — | — | — |
|  | Antioxidant, % | — | — | — | — | — | — | 0.01 |
| Cascade | Introduction Port | 35.5 | 38.8 | 49.7 | 57.2 | 70.0 | 49.9 | 53.8 |
| Impactor | Stage 0 | 1.8 | 2.0 | 2.4 | 2.6 | 4.1 | 3.1 | 1.6 |
| Mass Data | Stage 1 | 2.7 | 3.1 | 4.0 | 4.8 | 6.7 | 4.8 | 1.5 |
| (mcg) | Stage 2 | 4.5 | 5.3 | 6.7 | 8.4 | 11.6 | 7.3 | 3.2 |
|  | Stage 3 | 12.8 | 14.1 | 18.7 | 22.0 | 27.6 | 18.2 | 16.4 |
|  | Stage 4 | 17.4 | 18.2 | 22.1 | 25.9 | 27.5 | 22.4 | 30 |
|  | Stage 5 | 14.4 | 13.7 | 18.3 | 21.5 | 22.0 | 16.4 | 18.4 |
|  | Stage 6 | 2.6 | 2.3 | 2.7 | 3.3 | 3.4 | 2.3 | 1.8 |
|  | Stage 7 | 0.5 | 0.5 | 0.5 | 0.6 | 0.6 | 0.5 | 0.3 |
|  | Stage F | 0.4 | 0.4 | 0.5 | 0.5 | 0.7 | 0.6 | 0.6 |
| Total | Total, mcg | 92.6 | 98.3 | 125.5 | 147.0 | 174.2 | 125.4 | 127.6 |
| EPM | S6-Filter, mcg | 3.6 | 3.1 | 3.7 | 4.5 | 4.7 | 3.4 | 2.7 |
| ISM | S0-Filter, mcg | 57.1 | 59.4 | 75.8 | 89.8 | 104.3 | 75.5 | 73.8 |
| FPM | S3-Filter, mcg | 48.2 | 49.1 | 62.8 | 73.9 | 81.8 | 60.3 | 67.5 |
| FPF | (S3-Filter)/Total, % | 52% | 50% | 50% | 50% | 47% | 48% | 53% |
| MMAD | μm | 2.78 | 2.91 | 2.90 | 2.92 | 2.97 | 3.04 | 2.66 |
| GSD |  | 1.69 | 1.67 | 1.66 | 1.66 | 1.63 | 1.68 | 1.50 |

TABLE 3-2

Respirable Drug Delivery Assessment of Epinephrine Inhalation Formulations

|  |  | This Application |  |  |  |  | Primatene |
|---|---|---|---|---|---|---|---|
|  |  | Formulation No. |  |  |  |  | MIST ® |
|  | Type of | 10 | 12 | 14 | 15 | 16 | HFA |
| Dose | Strength, mcg | 125 | 125 | 125 | 125 | 125 | 125 |
| Formulation | Epinephrine, % | 0.26 | 0.26 | 0.26 | 0.26 | 0.26 | 0.1732 |
| (w/w) | HFA 134a, % | — | — | — | — | — | 98.8 |
|  | HFO 1234ze(E), % | 94.7 | 91.5 | 98.5 | 94.5 | 94.5 | — |
|  | Ethanol, % | 5 | 8 | 1 | 5 | 5 | 1 |
|  | Oleic Acid, % | — | — | — | — | 0.2 | — |
|  | Polysorbate 80, % | 0.02 | 0.02 | 0.2 | — | — | 0.02 |
|  | Lecithin, % | — | — | — | 0.2 | — | — |
|  | PEG1000, % | — | 0.2 | — | — | — | — |
|  | Antioxidant, % | — | — | — | — | — | 0.01 |
| Cascade | Introduction Port | 82.2 | 94.5 | 53.1 | 77.3 | 82.4 | 53.8 |
| Impactor | Stage 0 | 3.1 | 5.2 | 3.0 | 11.7 | 3.7 | 1.6 |
| Mass Data | Stage 1 | 2.4 | 2.6 | 5.4 | 3.6 | 2.9 | 1.5 |
| (mcg) | Stage 2 | 3.6 | 4.1 | 8.3 | 4.7 | 4.4 | 3.2 |
|  | Stage 3 | 10.6 | 9.2 | 21.5 | 11.8 | 11.9 | 16.4 |
|  | Stage 4 | 14.1 | 8.6 | 21.4 | 10.9 | 12.2 | 30 |
|  | Stage 5 | 9.9 | 5.4 | 11.3 | 6.2 | 7.4 | 18.4 |
|  | Stage 6 | 1.6 | 0.7 | 0.9 | 0.6 | 0.9 | 1.8 |
|  | Stage 7 | 0.3 | 0.1 | 0.1 | 0.1 | 0.1 | 0.3 |
|  | Stage F | 0.3 | 0.0 | 0.0 | 0.0 | 0.0 | 0.6 |
| Total | Total, mcg | 128.2 | 130.4 | 125.1 | 126.9 | 125.8 | 127.6 |
| EPM | S6-Filter, mcg | 2.3 | 0.8 | 1.0 | 0.6 | 0.9 | 2.7 |
| ISM | S0-Filter, mcg | 46.0 | 35.9 | 72.0 | 49.6 | 43.4 | 73.8 |
| FPM | S3-Filter, mcg | 36.9 | 24.0 | 55.2 | 29.5 | 32.4 | 67.5 |
| FPF | (S3-Filter)/Total, % | 29% | 18% | 44% | 23% | 26% | 53% |
| MMAD | μm | 2.99 | 3.72 | 3.42 | 4.07 | 3.41 | 2.66 |
| GSD |  | 1.73 | 2.21 | 1.56 | 1.84 | 1.67 | 1.50 |

Example 4: Effects of Particle Size of Micronized Epinephrine in HFO-1234ze(E) Formulations on Respirable Drug Delivery Drug particles' deposition in the lung depends largely upon the particle size. Usually, particles of 0.5-3 µm in diameter (VMD) are desirable for aerosol delivery to the lung periphery. Particles smaller than 0.5 µm, however, are not desirable due to their higher likelihood of being exhaled.

Figure 5:
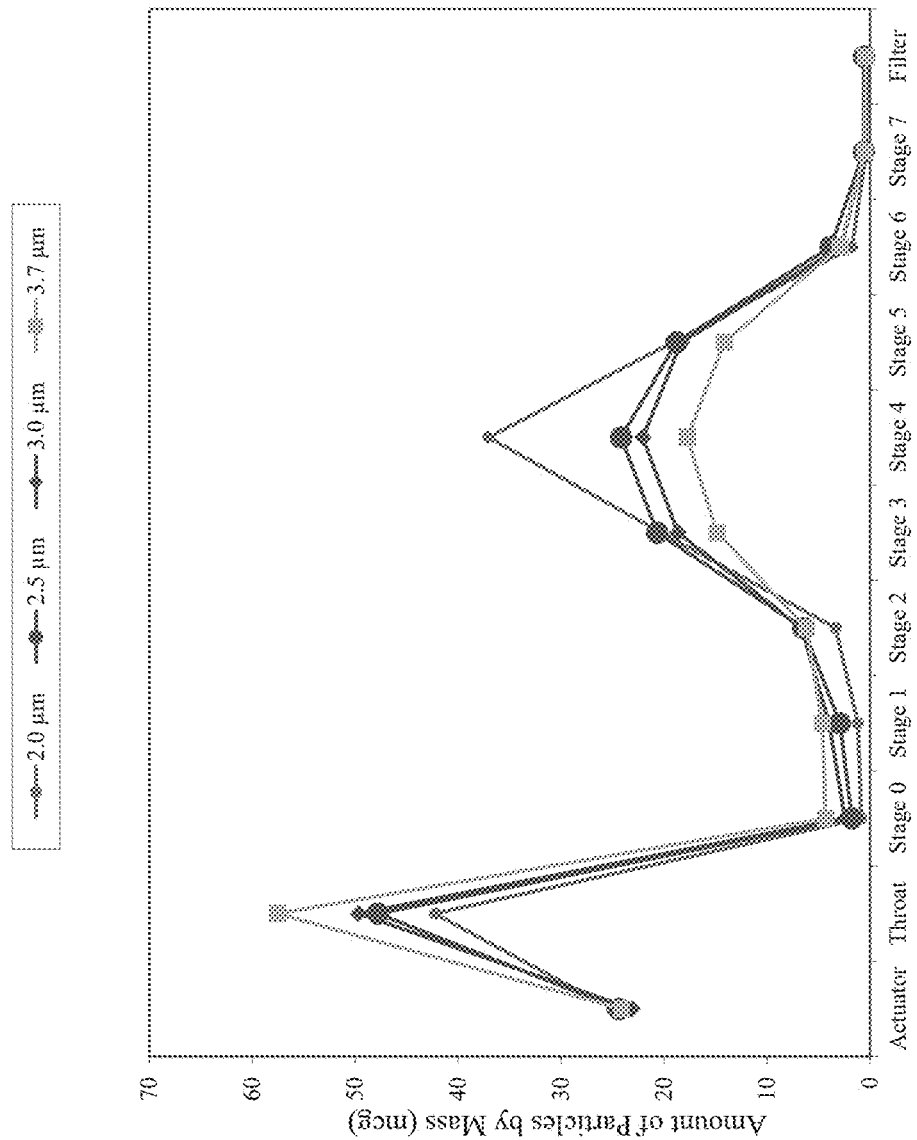
FIG. 5 is a chart showing the particle size effect of micro-epinephrine/HFO formulations on Andersen Stage Distribution, Direct Weight.
Figure 6:
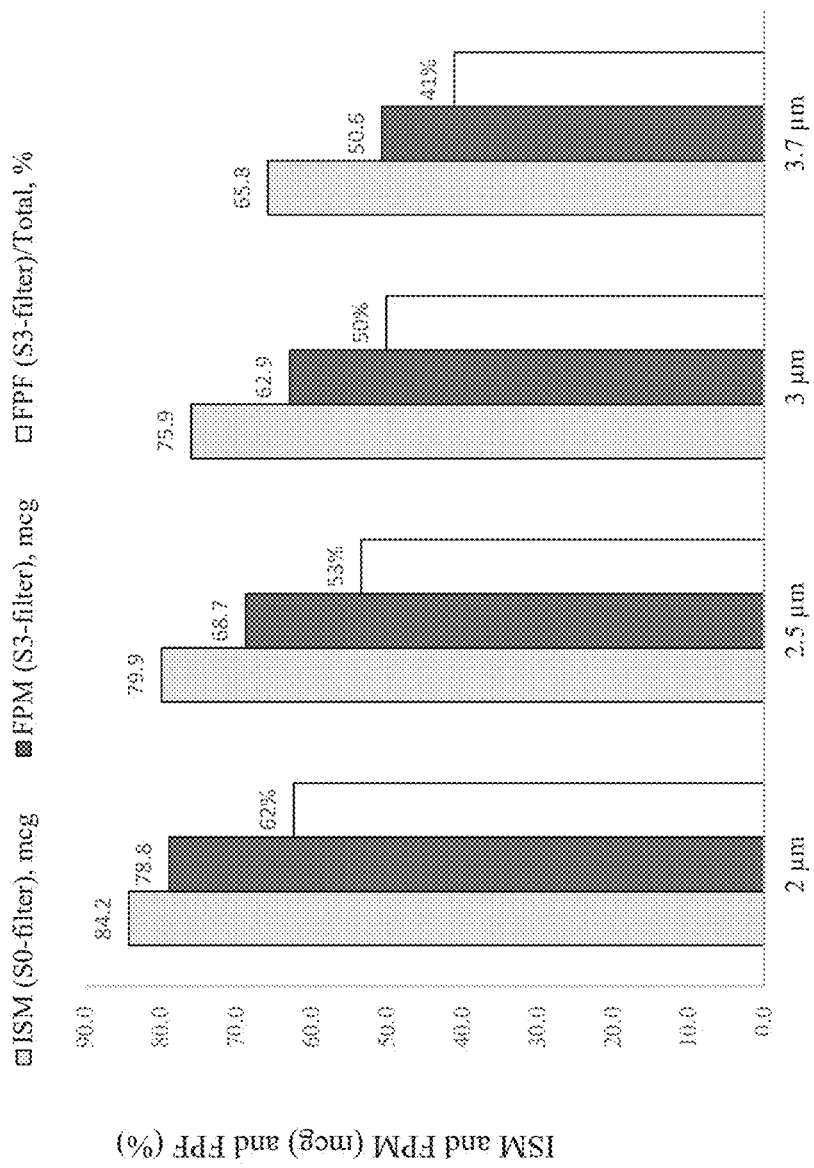
FIG. 6 is a chart showing a comparison of ISM, FPM, and FPF of Epinephrine-HFO Pressurized MDI with various particle sizes.

A study of the effect of micro-epinephrine particle sizes on medication efficiency was performed by formulating micro-epinephrine with particle sizes of 2.0 µm, 2.5 µm, 3.0 µm and 3.7 µm, respectively in HFO-1234ze(E) with 1% w/w EtOH and 0.02% w/w T80. Andersen Cascade Impaction analysis was conducted for these formulations to evaluate the drug delivery efficiency via its FPF. The results are shown in Table 4-1, FIG. 5, and FIG. 6. When the epinephrine particle size is bigger, both FPF and FPM are lower, which indicates that fewer particles penetrate the deep lung. The respirable drug delivery efficiency has an inverse relationship to the particle size of the epinephrine. Therefore, the best possible particle size of the micronized epinephrine formulations was determined to be 2-3 µm.

TABLE 4-1

Micro-Epinephrine Particle Size Effect on Respirable Drug Delivery

| Formulation No. | | 3a | 3b | 3c | 3d |
|---|---|---|---|---|---|
| Strength (mcg) | | 125 | 125 | 125 | 125 |
| Micro-Epinephrine VMD (µm) | | 2.0 | 2.5 | 3.0 | 3.7 |
| Formulation (w/w) | Epinephrine, % | 0.26 | 0.26 | 0.26 | 0.26 |
| | HFO 1234ze(E), % | 98.72 | 98.72 | 98.72 | 98.72 |
| | Ethanol, % | 1 | 1 | 1 | 1 |
| | T80, % | 0.02 | 0.02 | 0.02 | 0.02 |
| Cascade Impactor Data (mcg) | Introduction Port | 42.3 | 47.8 | 49.7 | 57.6 |
| | Stage 0 | 0.9 | 1.8 | 2.4 | 4.3 |
| | Stage 1 | 1.2 | 2.9 | 4.0 | 4.6 |
| | Stage 2 | 3.4 | 6.5 | 6.7 | 6.2 |
| | Stage 3 | 20.2 | 20.7 | 18.7 | 14.9 |
| | Stage 4 | 37.1 | 24.2 | 22.1 | 17.8 |
| | Stage 5 | 19.1 | 18.8 | 18.3 | 14.1 |
| | Stage 6 | 1.8 | 2.7 | 2.7 | 2.9 |
| | Stage 7 | 0.4 | 0.6 | 0.5 | 0.5 |
| | Stage F | 0.3 | 0.6 | 0.5 | 0.4 |
| Total | Total, mcg | 126.5 | 126.5 | 125.5 | 123.3 |
| EPM | S6-Filter, mcg | 2.4 | 3.9 | 3.7 | 3.8 |
| ISM | S0-Filter | 84.2 | 78.7 | 75.8 | 65.8 |
| FPM | S3-Filter, mcg | 78.8 | 67.5 | 62.8 | 50.6 |
| FPF | S3-Filter/Total, % | 62 | 53 | 50 | 41 |
| MMAD, µm | | 2.73 | 2.85 | 2.90 | 3.08 |
| GSD | | 1.48 | 1.59 | 1.66 | 1.78 |

Example 5: Effects of Ethanol in Epinephrine HFO-1234ze(E) Formulations on Respirable Drug Delivery The co-solvent ethanol is added to the formulation to help solubilize the surfactant and to improve the dispersion of the micronized epinephrine particles. An increase of ethanol in the aerosol formulation may lead to a decrease in vapor pressure in the pressurized MDI system, generating a significant number of larger particle droplets. This causes a lower amount of drug to be deposited in the deep lung.

Figure 7:
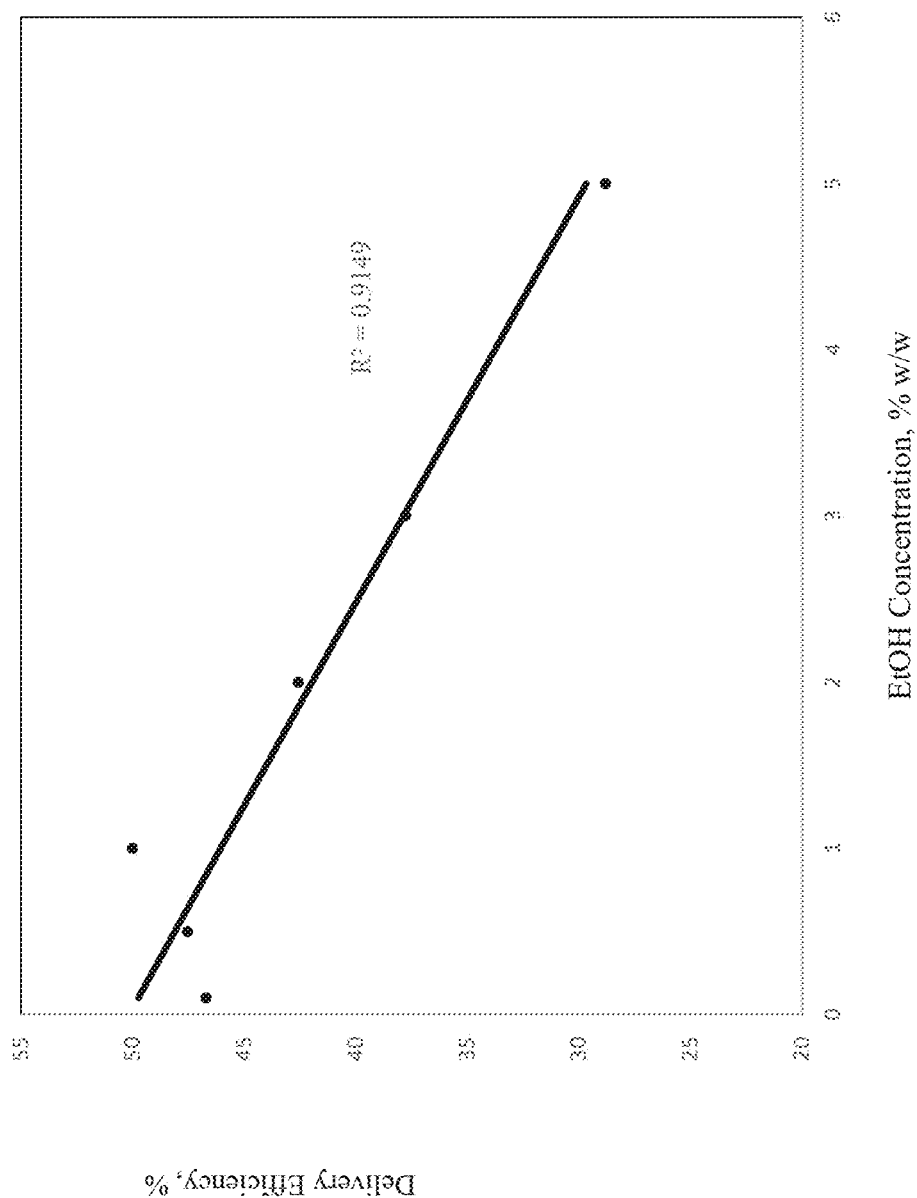
FIG. 7 is a chart showing the ethanol concentration effect on inhalable epinephrine/HFO-1234ze(E) formulations' in vitro performance.
Figure 8:
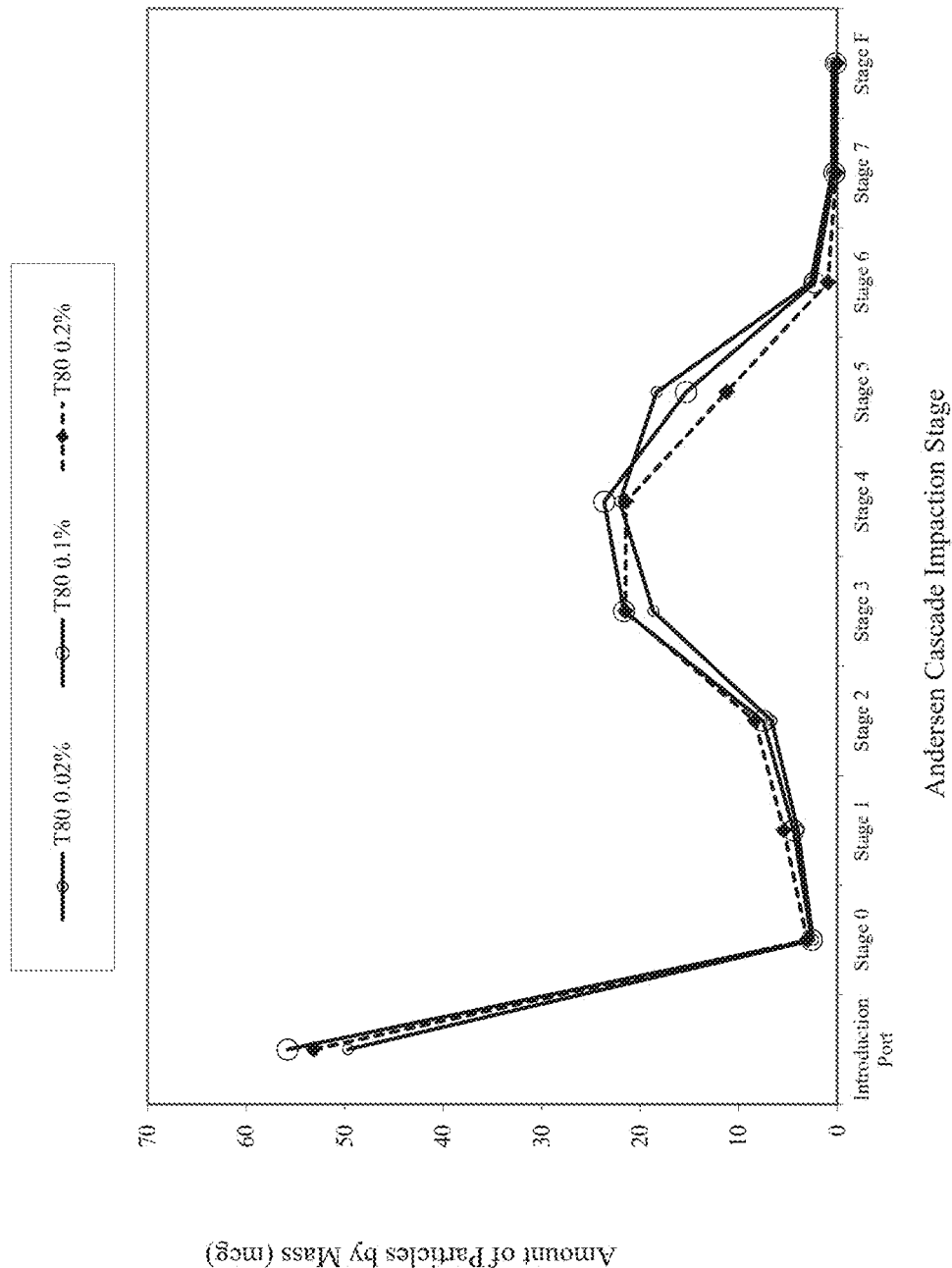
FIG. 8 is a chart showing the surfactant effect of epinephrine/HFO-1234ze(E) formulations on respirable drug delivery.

To determine the ethanol amount in the formulation, a study on the effect of ethanol on the drug delivery efficiency was conducted. Epinephrine suspensions by pressurized MDI with 0.1%-5% w/w ethanol were evaluated in vitro by an Andersen Cascade Impactor test. The results are summarized in Table 5-1, which show that the increase of ethanol in the aerosol formulation led to a decrease in its FPM. FIG. 7 shows that the drug delivery efficiency is inversely proportional to the amount of ethanol in the range of 1%-5% w/w; however, when ethanol is below 1% w/w, it did not show such relationship. FIG. 7 also demonstrates that the highest FPF (drug delivery efficiency) was obtained at 1% w/w ethanol. Therefore, the ideal ethanol amount in the formulations is between 0.5%-1.5% w/w.

TABLE 5-1

Ethanol Effect of Epinephrine Inhalation Formulations on Respirable Delivery

| | | Formulation No. | | | | | |
|---|---|---|---|---|---|---|---|
| | | 6 | 7 | 3 | 8 | 9 | 10 |
| Strength (mcg) | | 125 | 125 | 125 | 125 | 125 | 125 |
| Micro-Epinephrine VMD (µm) | | 3.0 | 3.0 | 3.0 | 3.0 | 3.0 | 3.0 |
| Formulation (w/w) | Epinephrine, % | 0.26 | 0.26 | 0.26 | 0.26 | 0.26 | 0.26 |
| | HFO 1234ze(E), % | 99.64 | 99.22 | 98.72 | 97.72 | 96.72 | 94.72 |
| | Ethanol, % | 0.1 | 0.5 | 1 | 2 | 3 | 5 |
| | T80, % | — | 0.02 | 0.02 | 0.02 | 0.02 | 0.02 |
| Cascade Impactor Data (mcg) | Introduction Port | 51.8 | 49.9 | 49.7 | 61.0 | 70.2 | 82.2 |
| | Stage 0 | 3.3 | 3.1 | 2.4 | 2.5 | 3.2 | 3.1 |
| | Stage 1 | 4.7 | 4.8 | 4.0 | 3.3 | 3.3 | 2.4 |
| | Stage 2 | 6.8 | 7.3 | 6.7 | 5.4 | 6.0 | 3.6 |
| | Stage 3 | 16.8 | 18.2 | 18.7 | 15.3 | 15.1 | 10.6 |
| | Stage 4 | 20.4 | 22.4 | 22.1 | 19.3 | 16.9 | 14.1 |
| | Stage 5 | 15.9 | 16.4 | 18.3 | 16.0 | 14.6 | 9.9 |
| | Stage 6 | 3.5 | 2.3 | 2.7 | 2.2 | 2.7 | 1.6 |
| | Stage 7 | 0.8 | 0.5 | 0.5 | 0.4 | 0.4 | 0.3 |
| | Stage F | 1.0 | 0.6 | 0.5 | 0.2 | 0.4 | 0.3 |
| Total | Total, mcg | 124.9 | 125.4 | 125.5 | 125.7 | 132.7 | 128.2 |
| EPM | S6-Filter, mcg | 5.3 | 3.4 | 3.7 | 2.9 | 3.5 | 2.3 |
| ISM | S0-Filter | 73.1 | 75.5 | 75.8 | 64.7 | 62.6 | 46.0 |

TABLE 5-1-continued

Ethanol Effect of Epinephrine Inhalation Formulations on Respirable Delivery

| | | Formulation No. | | | | | |
|---|---|---|---|---|---|---|---|
| | | 6 | 7 | 3 | 8 | 9 | 10 |
| FPM | S3-Filter, mcg | 58.3 | 60.3 | 62.8 | 53.5 | 50.1 | 36.9 |
| FPF | S3-Filter/Total, % | 47 | 48 | 50 | 43 | 38 | 29 |
| MMAD, μm | | 2.97 | 3.04 | 2.90 | 2.89 | 3.00 | 2.99 |
| GSD | | 1.73 | 1.68 | 1.66 | 1.68 | 1.70 | 1.73 |

Example 6: Effects of Surfactant in Epinephrine HFO-1234ze(E) Formulations on Respirable Drug Delivery A small amount of surfactant was added to improve epinephrine particle dispersion in HFO-1234ze(E), enhance the suspension's physical stability, and prevent epinephrine particle sedimentation and creaming. Several surfactants, such as oleic acid, lecithin, polyethylene glycol, and polysorbate, were studied for the epinephrine suspension formulation with the amount of 0.02% to 0.3% w/w (see Table 2-1 above). The Andersen Cascade Impaction data of epinephrine formulations with 0.02%, 0.1%, and 0.2% w/w T80 are summarized in Table 6-1 and FIG. 8. The data shows that with the increase of T80, more particles deposited on stage 0-2 and fewer particles deposited on stage 6-filter, especially for the formulation with 0.2% w/w T80. Increasing T80 led to a greater MMAD and a lower FPF. Therefore, the ideal T80 amount in the formulation is between 0.02%-0.1% w/w.

TABLE 6-1

Surfactant Effect of Epinephrine Inhalation Formulations on Respirable Drug Delivery

| Formulation No. | | 3 | 13 | 14 |
|---|---|---|---|---|
| Strength (mcg) | | 125 | 125 | 125 |
| Micro-Epinephrine VMD (μm) | | 3.0 | 3.0 | 3.0 |
| Formulation (w/w) | Epinephrine, % | 0.26 | 0.26 | 0.26 |
| | HFO 1234ze(E), % | 98.72 | 98.64 | 98.54 |
| | Ethanol, % | 1 | 1 | 1 |
| | T80, % | 0.02 | 0.1 | 0.2 |
| Cascade Impactor Data (mcg) | Introduction Port | 49.7 | 55.8 | 53.1 |
| | Stage 0 | 2.4 | 2.6 | 3.0 |
| | Stage 1 | 4.0 | 4.4 | 5.4 |
| | Stage 2 | 6.7 | 7.5 | 8.3 |
| | Stage 3 | 18.7 | 21.6 | 21.5 |
| | Stage 4 | 22.1 | 23.6 | 21.4 |
| | Stage 5 | 18.3 | 15.3 | 11.3 |
| | Stage 6 | 2.7 | 2.3 | 0.9 |
| | Stage 7 | 0.5 | 0.3 | 0.1 |
| | Stage F | 0.5 | 0.1 | 0.0 |
| Total | Total, mcg | 125.5 | 133.6 | 125.1 |
| EPM | S6-Filter, mcg | 3.7 | 2.7 | 1.0 |
| ISM | S0-Filter | 75.8 | 77.8 | 72.0 |
| FPM | S3-Filter, mcg | 62.8 | 63.3 | 55.2 |
| FPF | S3-Filter/Total, % | 50 | 47 | 44 |
| MMAD, μm | | 2.90 | 3.14 | 3.42 |
| GSD | | 1.66 | 1.57 | 1.56 |

Example 7: Comparison of Impurities Between the HFO-1234ze(E) Formulations and Primatene MIST® HFA The chemical stability of the invention formulation was studied by evaluating the finished product's API impurities. Specifically, the percentage of total impurities and the percentage of epinephrine sulfonic acid were compared for Primatene MIST® HFA with an antioxidant and epinephrine in HFO-1234ze without an antioxidant initially and after storage for three months at 40° C., 75% relative humidity.

U.S. Pat. No. 8,367,734 ("the '734 patent"), which is orange book listed for Primatene MIST® HFA, discloses "a [ ] epinephrine suspension formulation with improved formulation characteristics that . . . eliminat[es] the use of CFCs and add[s] an antioxidant to produce a stable formulation that exhibits a significantly higher drug deposition in the respirable region of a patient's lungs." '734 patent at col. 3, lines 1-6. The '734 patent further discloses that "epinephrine formulation[s] with antioxidant can reduce the total impurities 39 times compared to the formulation without an antioxidant. The high level of impurities during long-term storage in the formulation without the antioxidant thymol can cause the formulation to become unstable, fall out of specification, and make the formulation practically not usable." Id. at col. 6, lines 23-29. The '734 patent notes that "the formulation . . . contains a significantly lower amount of alcohol and includes the addition of an antioxidant and exhibits a significantly higher delivery efficiency." Id. at col. 7, line 67 to col. 8, line 3.

The testing results in Table 7-1 show that the invention formulation without an antioxidant has fewer total impurities than the Primatene MIST® HFA formulation in HFA-134a which contains an antioxidant, after storing at 40° C., 75% relative humidity for 3 months. The data in Table 7-1 demonstrates that the formulation without an antioxidant is stable.

TABLE 7-1

Impurity Information of HFO-1234ze(E) Formulations vs. Primatene MIST ® HFA

| Product | Lot No. | Potency mcg/inh | Time | Epinephrine Sulfonic Acid (ESA)* % | Total Impurities % |
|---|---|---|---|---|---|
| Primatene MIST ® HFA with Antioxidant | 0800510 | 125 | initial | 0.10 | 0.27 |
| | | | 3 month** | 0.10 | 0.40 |
| Epinephrine in HFO-1234ze w/o Antioxidant | E104-3 | 125 | initial | 0.12 | 0.24 |
| | | | 3 month** | 0.12 | 0.30 |

*The most common impurity

**Storage condition, 40° C., 75% Relative Humidity

Example 8: Comparison of Storage Stability Between the HFO-1234Ze(E) Formulations and Primatene MIST® HFA The performance stability of the invention formulation was evaluated by Andersen Cascade Impactor analysis after storing at room temperature for one year (see Table 8-1 below). The data showed that both the change in delivery efficiency and the change in MMAD for the formulations of the disclosure are less than 5% and are less than those of Primatene MIST® in HFA-134a, which demonstrates the stability of the formulations of the disclosure.

TABLE 8-1

Stability of Delivery Efficiency and MMAD for the HFO-1234ze(E) Formulations vs. Primatene MIST ® HFA

| Product | Lot No. | Potency mcg/inh | Storage Condition | FPF, % | MMAD, μm | Relative change of FPF | Relative change of MMAD |
|---|---|---|---|---|---|---|---|
| Primatene MIST ® HFA with Antioxidant | PR324F2 | 125 | initial<br>1 year, rt | 53.7<br>48.1 | 2.664<br>2.578 | −10.4% | −3.2% |
| Epinephrine in HFO-1234ze(E), w/o Antioxidant | E104-3 | 125 | initial<br>1 year, rt | 50.0<br>48.3 | 2.997<br>2.986 | −3.4% | −0.4% |

Embodiments

The invention provides also the following non-limiting embodiments.

Embodiment 1 is a pharmaceutical aerosol formulation for use with a pressurized metered dose inhaler (MDI) comprising: (a) a suspension formulation of pre-micronized epinephrine free base or a pharmaceutically acceptable salt thereof; (b) a pressurized, liquefied propellant comprising a hydrofluoroolefin (HFO) present in an amount of from about 91% to about 99% (w/w) relative to the total weight of the formulation; (c) a co-solvent not more than about 8% (w/w) relative to the total weight of the formulation; and (d) a surfactant in an amount not more than about 0.2% (w/w) relative to the total weight of the formulation.

Embodiment 2 is the pharmaceutical aerosol formulation of embodiment 1, wherein the pre-micronized epinephrine free base or a pharmaceutically acceptable salt thereof has a particle size in a range of less than 5 μm in diameter and/or is present in an amount of from about 0.10% to about 0.50% (w/w) relative to the total weight of the formulation.

Embodiment 3 is the pharmaceutical aerosol formulation of embodiments 1 or 2, wherein the formulation is for use with a pressurized metered dose inhaler comprising a canister, a valve, an actuator having a mouthpiece, and a dose indicator.

Embodiment 4 is the pharmaceutical aerosol formulation of embodiment 3, wherein the epinephrine dose strength is in an amount of from about 90 mcg to about 175 mcg per actuation out of the mouthpiece of the actuator.

Embodiment 5 is the pharmaceutical aerosol formulation of any one of embodiments 1-4, wherein said liquefied propellant comprises trans-1,3,3,3-tetrafluoropropene (HFO-1234ze(E)).

Embodiment 6 is the pharmaceutical aerosol formulation of any one of embodiments 1-5, wherein said co-solvent is selected from the group consisting of ethyl alcohol, isopropyl alcohol, propylene glycol, ethylene glycol, propane, butane, isobutene, pentane, dimethyl ether, diethyl ether, and a combination thereof.

Embodiment 7 is the pharmaceutical aerosol formulation of embodiment 6, wherein the co-solvent is ethanol.

Embodiment 8 is the pharmaceutical aerosol formulation of embodiment 7, wherein the ethanol is present in an amount of 0.1% to 8.0% (w/w) relative to the total weight of the formulation.

Embodiment 9 is the pharmaceutical aerosol formulation of any of the preceding embodiments, wherein said surfactant is selected from the group consisting of polysorbate, polyethylene glycol, oleic acid, lecithin, and a combination thereof.

Embodiment 10 is the pharmaceutical aerosol formulation of any one of embodiments 1-8, wherein the surfactant comprises polysorbate 80.

Embodiment 11 is the pharmaceutical aerosol formulation of embodiment 10, wherein the polysorbate 80 is present in an amount of not more than 0.2% (w/w) relative to the total weight of the formulation.

Embodiment 12 is the pharmaceutical aerosol formulation of embodiment 1 comprising: a suspension formulation of pre-micronized epinephrine free base or a pharmaceutically acceptable salt thereof in an amount of from about 0.10% to about 0.50% (w/w) relative to the total weight of the formulation; HFO-1234ze(E) present in an amount of 91% to 99% (w/w) relative to the total weight of the formulation; not more than 8% (w/w) of ethanol relative to the total weight of the formulation; and a polysorbate in an amount not more than 0.2% (w/w) relative to the total weight of the formulation.

Embodiment 13 is the pharmaceutical aerosol formulation of embodiment 12 comprising: (a) a suspension formulation of pre-micronized epinephrine free base or a pharmaceutically acceptable salt thereof in an amount of from about 0.25% to about 0.27% (w/w) relative to the total weight of the formulation; (b) HFO-1234ze(E) present in an amount of from about 98% to about 99% (w/w) relative to the total weight of the formulation; (c) from about 0.5% to about 1.5% (w/w) of ethanol relative to the total weight of the formulation; and (d) polysorbate 80 in an amount not more than 0.02% (w/w) relative to the total weight of the formulation.

Embodiment 14 is the pharmaceutical aerosol formulation of any one of embodiments 1 to 13, wherein the formulation does not contain an antioxidant. Alternatively, Embodiment 14 is the pharmaceutical aerosol formulation of any one of embodiments 1 to 13 without an antioxidant.

Embodiment 15 is the pharmaceutical aerosol formulation of any one of embodiments 1 to 14, wherein the formulation does not contain (does not require) an antioxidant selected from the group consisting of thymol, tocopherol, ascorbyl palmitate, butylated hydroxyanisole, butylated hydroxytoluene, propyl gallate, citric acid, sodium metabisulfite, sodium sulfite, and a combination thereof.

While the invention has been described and illustrated herein by references to various specific materials, procedures, and examples, it is understood that the invention is not restricted to the combinations of material and procedures selected for that purpose. Numerous variations of such details can be implied as will be appreciated by those skilled in the art. It is intended that the specification and examples be considered as exemplary, only, with the true scope and spirit of the invention being indicated by the following claims. All references, patents, and patent applications referred to in this application are herein incorporated by reference in their entirety.

What is claimed is:

1. A pharmaceutical aerosol formulation for use with a pressurized metered dose inhaler (MDI) comprising:
    (a) a suspension formulation of pre-micronized epinephrine free base or a pharmaceutically acceptable salt thereof;
    (b) a pressurized, liquefied propellant comprising a hydrofluoroolefin (HFO) present in an amount of from about 91% to about 99% w/w relative to the total weight of the formulation;
    (c) a co-solvent not more than about 8% w/w relative to the total weight of the formulation; and
    (d) a surfactant in an amount not more than about 0.2% w/w relative to the total weight of the formulation,
    wherein the pharmaceutical aerosol formulation is stable and wherein the formulation does not contain an antioxidant.

2. The pharmaceutical aerosol formulation of claim 1, wherein the pre-micronized epinephrine free base or a pharmaceutically acceptable salt thereof has a particle size in a range of less than 5 μm in diameter and/or is present in an amount of from about 0.10% to about 0.50% w/w relative to the total weight of the formulation.

3. The pharmaceutical aerosol formulation of claim 1, wherein the formulation is for use with a pressurized metered dose inhaler comprising a canister, a valve, an actuator having a mouthpiece, and a dose indicator.

4. The pharmaceutical aerosol formulation of claim 3, wherein the epinephrine dose strength is in an amount of from about 90 mcg to about 175 mcg per actuation out of the mouthpiece of the actuator.

5. The pharmaceutical aerosol formulation of claim 1, wherein said liquefied propellant comprises trans-1,3,3,3-tetrafluoropropene (HFO-1234ze(E)).

6. The pharmaceutical aerosol formulation of claim 1, wherein said co-solvent is selected from the group consisting of ethyl alcohol, isopropyl alcohol, propylene glycol, ethylene glycol, propane, butane, isobutene, pentane, dimethyl ether, diethyl ether, and a combination thereof.

7. The pharmaceutical aerosol formulation of claim 6, wherein the co-solvent is ethanol.

8. The pharmaceutical aerosol formulation of claim 7, wherein the ethanol is present in an amount of 0.1% to 8.0% w/w relative to the total weight of the formulation.

9. The pharmaceutical aerosol formulation of claim 1, wherein said surfactant is selected from the group consisting of polysorbate, polyethylene glycol, oleic acid, lecithin, and a combination thereof.

10. The pharmaceutical aerosol formulation of claim 1, wherein the surfactant comprises polysorbate 80.

11. The pharmaceutical aerosol formulation of claim 10, wherein the polysorbate 80 is present in an amount of not more than 0.2% w/w relative to the total weight of the formulation.

12. The pharmaceutical aerosol formulation of claim 1 comprising:
    (a) a suspension formulation of pre-micronized epinephrine free base or a pharmaceutically acceptable salt thereof in an amount of from about 0.10% to about 0.50% w/w relative to the total weight of the formulation;
    (b) HFO-1234ze(E) present in an amount of 91% to 99% w/w relative to the total weight of the formulation;
    (c) not more than 8% w/w of ethanol relative to the total weight of the formulation; and
    (d) a polysorbate in an amount not more than 0.2% w/w relative to the total weight of the formulation.

13. The pharmaceutical aerosol formulation of claim 12 comprising:
    (a) a suspension formulation of pre-micronized epinephrine free base or a pharmaceutically acceptable salt thereof in an amount of from about 0.25% to about 0.27% w/w relative to the total weight of the formulation;
    (b) HFO-1234ze(E) present in an amount of from about 98% to about 99% w/w relative to the total weight of the formulation;
    (c) from about 0.5% to about 1.5% w/w of ethanol relative to the total weight of the formulation; and
    (d) polysorbate 80 in an amount not more than 0.02% w/w relative to the total weight of the formulation.

14. The pharmaceutical aerosol formulation of claim 1, wherein the formulation does not contain an antioxidant selected from the group consisting of thymol, tocopherol, ascorbyl palmitate, butylated hydroxyanisole, butylated hydroxytoluene, propyl gallate, citric acid, sodium metabisulfite, sodium sulfite, and a combination thereof.

15. The pharmaceutical aerosol formulation of claim 1, wherein the formulation has about 0.3% of total impurities or about 0.12% of ESA after storage for three-months at 40° C., 75% relative humidity.

16. The pharmaceutical aerosol formulation of claim 1, wherein the formulation has a difference of about 0.06% of total impurities after storage for three-months at 40° C., 75% relative humidity.

17. The pharmaceutical aerosol formulation of claim 1, wherein the formulation is stable for at least one year when stored at room temperature.

18. A stable pharmaceutical aerosol formulation for use with a pressurized metered dose inhaler (MDI) comprising:
    (a) a suspension formulation of pre-micronized epinephrine free base or a pharmaceutically acceptable salt thereof in an amount of from about 0.10% to about 0.50% w/w relative to the total weight of the formulation;
    (b) HFO-1234ze(E) present in an amount of 91% to 99% w/w relative to the total weight of the formulation;
    (c) not more than 8% w/w of ethanol relative to the total weight of the formulation; and
    (d) a polysorbate in an amount not more than 0.2% w/w relative to the total weight of the formulation, wherein the formulation does not contain an antioxidant and is stable for at least one year when stored at room temperature.

19. The pharmaceutical aerosol formulation of claim 18 comprising:
    (a) a suspension formulation of pre-micronized epinephrine free base or a pharmaceutically acceptable salt thereof in an amount of from about 0.25% to about 0.27% w/w relative to the total weight of the formulation;
    (b) HFO-1234ze(E) present in an amount of from about 98% to about 99% w/w relative to the total weight of the formulation;

(c) from about 0.5% to about 1.5% w/w of ethanol relative to the total weight of the formulation; and (d) polysorbate 80 in an amount not more than 0.02% w/w relative to the total weight of the formulation.

20. The pharmaceutical aerosol formulation of claim 18, wherein the formulation has about 0.3% of total impurities or about 0.12% of ESA after storage for three-months at 40° C., 75% relative humidity.

21. The pharmaceutical aerosol formulation of claim 18, wherein the formulation has a difference of about 0.06% of total impurities after storage for three-months at 40° C., 75% relative humidity.

* * * * *